(12) United States Patent
Liebald et al.

(10) Patent No.: US 10,988,408 B2
(45) Date of Patent: *Apr. 27, 2021

(54) CONVERSION MATERIAL FOR WHITE OR COLORED LIGHT SOURCE, METHOD OF PRODUCTION, AND LIGHT SOURCE HAVING THE CONVERSION MATERIAL

(71) Applicant: SCHOTT AG, Mainz (DE)

(72) Inventors: Rainer Liebald, Nauheim (DE); Claudia Stolz, Ingelheim (DE); Peter Brix, Mainz (DE); Simone Monika Ritter, Mainz (DE); Peter Nass, Mainz (DE); Dieter Goedeke, Landshut (DE); Sabine Pichler-Wilhelm, Landshut (DE); Sabrina Wimmer, Altdorf (DE)

(73) Assignee: SCHOTT AG, Mainz (DE)

( * ) Notice: Subject to any disclaimer, the term of this patent is extended or adjusted under 35 U.S.C. 154(b) by 532 days.

This patent is subject to a terminal disclaimer.

(21) Appl. No.: 15/916,403

(22) Filed: Mar. 9, 2018

(65) Prior Publication Data

US 2018/0194673 A1 Jul. 12, 2018

Related U.S. Application Data

(63) Continuation of application No. 12/990,355, filed as application No. PCT/EP2009/003111 on Apr. 29, 2009, now Pat. No. 9,950,949.

(30) Foreign Application Priority Data

Apr. 29, 2008 (DE) .......................... 102008021438.8

(51) Int. Cl.
*C03C 14/00* (2006.01)
*C03C 4/12* (2006.01)
(Continued)

(52) U.S. Cl.
CPC ............ *C03C 14/006* (2013.01); *C03C 3/068* (2013.01); *C03C 3/091* (2013.01); *C03C 3/093* (2013.01);
(Continued)

(58) Field of Classification Search
CPC ......... C03C 3/091; C03C 3/093; C03C 3/089; C03C 3/095; C03C 3/068; C03C 3/066;
(Continued)

(56) References Cited

U.S. PATENT DOCUMENTS 9,950,949 B2 * 4/2018 Liebald .................. C03C 3/093
2003/0227249 A1 12/2003 Mueller
(Continued)

FOREIGN PATENT DOCUMENTS

DE 102005023134 11/2006
DE 102006027307 12/2007
(Continued)

OTHER PUBLICATIONS

International Preliminary Report on Patentability corresponding to PCT/EP2009/003111, dated Apr. 23, 2010.
(Continued)

*Primary Examiner* — Matthew E. Hoban
*Assistant Examiner* — Lynne Edmondson
(74) *Attorney, Agent, or Firm* — Ohlandt, Greeley, Ruggiero & Perle, L.L.P.

(57) ABSTRACT

A conversion material for a white or colored light source is provided. The material includes a matrix glass that, as bulk material, for a thickness of about 1 mm, has a pure transmission of greater than 80% in the wavelength region from 350 to 800 nm and in the region in which the primary light source emits light, wherein the sum of transmission and reflection of the sintered matrix glass without luminophore is at least greater than 80% in the spectral region from 350
(Continued)

nm to 800 nm and in the spectral region in which the primary light source emits light.

20 Claims, 5 Drawing Sheets

(51) Int. Cl.
*C03C 3/068* (2006.01)
*C03C 3/095* (2006.01)
*C03C 3/16* (2006.01)
*C09K 11/02* (2006.01)
*C09K 11/77* (2006.01)
*C03C 3/091* (2006.01)
*C03C 3/093* (2006.01)

(52) U.S. Cl.
CPC .............. *C03C 3/095* (2013.01); *C03C 3/16* (2013.01); *C03C 4/12* (2013.01); *C09K 11/02* (2013.01); *C09K 11/7774* (2013.01); *C03C 2214/16* (2013.01)

(58) Field of Classification Search
CPC ........... C03C 3/064; C03C 3/097; C03C 3/16; C03C 3/115; C03C 3/118; C03C 4/085; C03C 4/12; C03C 4/00; C03C 14/006; C03C 14/004; C03C 8/04; C03C 8/08; C03C 17/007; C03C 2204/00; C09K 11/7774; C09K 11/02; C09K 11/08; H01L 33/502

See application file for complete search history.

(56) References Cited

U.S. PATENT DOCUMENTS

| | | | |
|---|---|---|---|
| 2004/0023787 A1 | 2/2004 | Wolff | |
| 2007/0281851 A1* | 12/2007 | Seneschal-Merz | ..... C04B 35/64 501/10 |
| 2008/0029780 A1 | 2/2008 | Ohtsuka | |
| 2008/0030976 A1 | 2/2008 | Murazaki | |
| 2008/0035887 A1 | 2/2008 | Iwao | |
| 2009/0072700 A1* | 3/2009 | Kameshima | ....... C09K 11/7774 313/483 |
| 2009/0206352 A1 | 8/2009 | Becker | |
| 2009/0314989 A1 | 12/2009 | Iwao | |

FOREIGN PATENT DOCUMENTS

| | | |
|---|---|---|
| EP | 0936682 | 8/1999 |
| EP | 1411557 | 4/2004 |
| EP | 1880983 | 1/2008 |
| GB | 2099207 | 12/1982 |
| JP | H10101371 | 4/1998 |
| JP | 2003258308 | 9/2003 |
| JP | 2006052345 | 2/2006 |
| JP | 2007123410 | 5/2007 |
| WO | 2006039017 | 4/2006 |
| WO | 2006120827 | 11/2006 |
| WO | 2006122524 | 11/2006 |

OTHER PUBLICATIONS

Ehrt, D., "Structure, properties and applications of borate glasses", Glass Technology, vol. 41, No. 6, Dec. 2000, pp. 182-185.
Hamilton, E., "Properties of Zinc Borosilicate Glasses", Journal of Research of the National Bureau of Standards, vol. 62, No. 2, Feb. 1959, pp. 59-62.
Volf, M., "Technical Approach to Glass", Elsevier, 1990, p. 301.
Olevsky, E., "Theory of sintering: from discrete to continuum", Materials Science and Engineering, vol. 23, 1998, pp. 41-100.
English translation of International Preliminary Report on Patentability dated Feb. 17, 2011, corresponding to PCT/EP2009/003111.
Office Action dated Mar. 23, 2012 corresponding to European Patent Application No. 09 737 884.8-1218 (with English translation).
Schott Taschenkatalog "Optisches Glas, Beschreibung der Eigenschaften 2009;" pp. 13, 47, 48, XP007919902 (with English translation).
Werner Vogel: "Glaschemie;" Third Ed., 1992, pp. 36-38, XP007920388 (with English translation).
Heinz G. Pfaender: "Schott Glaslexikon;" 1997, pp. 26-27, XP007919903 (with English translation).
English Translation of Taiwanese Search Report dated Apr. 29, 2009 corresponding to PCT/US2005/030399, 1 pp.

* cited by examiner

CONVERSION MATERIAL FOR WHITE OR COLORED LIGHT SOURCE, METHOD OF PRODUCTION, AND LIGHT SOURCE HAVING THE CONVERSION MATERIAL

CROSS REFERENCE TO RELATED APPLICATIONS

This application is a continuation of U.S. application Ser. No. 12/990,355 filed Oct. 29, 2010, which is a national stage entry of International Application No. PCT/EP2009/003111 filed Apr. 29, 2009, which claims benefit under 35 U.S.C. § 119(a) of German Applications No. DE200810021438 filed Apr. 29, 2008, the entire contents of all of which are incorporated herein by reference.

BACKGROUND

1. Field of the Invention

The invention relates to a conversion material, particularly for a white or colored light source comprising a semiconductor light source, as well as a light source comprising said conversion material.

The invention is intended to provide, in particular, a conversion material for at least partial conversion of the radiation of a primary light source, in which the primary radiation can comprise blue light, for example, into light of other wavelengths, which are referred to hereinafter also as secondary radiation and can comprise yellow light, for example, with the overlap of the primary and, as the case may be, broadband secondary radiation being capable of producing colored or white light.

Through the appropriate selection of the conversion material and the tuning of the overall system, it is possible in this way to adjust light colors or color coordinates of this light source.

2. Description of Related Art

Employed for the conversion of the radiation of the primary light source into light of other wavelengths are luminophores, which are also conventionally referred to as "phosphors." These luminophores are generally embedded in a matrix, through which the primary light radiates. The extent of the conversion can be adjusted by means of the thickness of the conversion material and the type and concentration of doping or dopings with luminophores.

The color coordinates of the emitted light can be adjusted within certain limits in this case through the extent of conversion, so that, when white light is produced, both warm and cold white points of the resulting overall radiation are made possible.

The production of white light, for example, by superimposing blue light, which is emitted by a primary light source, and yellow light, which is produced by conversion of the blue light of the primary light source, has been known for some time.

The technical solution established at the present time is based on phosphors that are present and bound in a polymer matrix, which generally is composed of epoxy resins or silicones.

A drawback in the case of these embodiments is, in particular, the sensitivity of the polymers toward environmental conditions, such as moisture and radiation, in particular short wavelengths (UV), and toward elevated temperatures of greater than 120° C., for example. Occurring separately or in combination, these lead to the deterioration or aging of the optical polymer properties, which are already in part non-optimal in any case. On account of the swelling, hazing, discoloration (yellowing, browning), or even decomposition of the polymers that then ensues, the performance and service life of these used optical systems are strongly impaired.

With increasing performance capacity, in particular light output, of the semiconductor light sources based on LED and laser diodes (LD), the thermal stability takes on increasing importance, because the increase in the performance of these light sources is achieved, among other things, by way of semiconductor systems with high allowable power densities and high currents, whereby the overall system is exposed not only to higher radiation power but also higher thermal load.

The temperature level that is already usual at the present time lies at about and markedly above 150° C. and, in some cases, even above 180° C. and follows a clear trend toward temperatures of greater than 200° C. Hence, in long-term use of several tens of thousands of hours and longer, the polymers already find themselves in the limit of their applicability at the present time and are to be classified as limiting parameters for the service life of such light sources.

In EP 0 936 682 B9 (Nichia, "Light emitting device and display device") a GaN-based blue-light-emitting diode (LED) is described as primary light source along with a yellow fluorescing luminophore for conversion, which is based on $(Y_{1-r}Gd_r)_3Al_5O_{12}$:Ce with r between 0 and 1. Transparent materials, such as epoxy resin, urea resin, silicone resin, or glass, are used as the matrix for embedding the luminophore.

In this case, however, all of the above-mentioned drawbacks of the polymers are manifested. No consideration is paid in this document to the intrinsic drawbacks of certain types of glass, such as occur, for example, in the case of Zn phosphates of certain compositions, such as reactivity with luminophores—for example, also redox reactions in this environment and intrinsic coloration, which have a negative influence on the conversion and performance properties of the overall light source.

US 2006/0113906 A1 (Nichia, "Light emitting device and method of manufacturing thereof")describes a diode having a glass plate for covering and for protecting the light-emitting chip, with the glass necessarily composed of $B_2O_3$ (20-30 wt %) and ZnO (50-60 wt %) and optionally composed of $SiO_2$ (0-10 wt %) and/or $TiO_2$ (0-10 wt %) and/or other components, having a glass temperature Tg between 200° C. and 700° C., preferably 430° C. to 600° C., and possibly containing fluorescent substances for light conversion. A glass plate is described as a cover of a semiconductor chip, the glass plate being arranged at a distance from the chip. It is further described that the glass can contain a luminophore, although no consideration is paid to how this glass can be manufactured with this luminophore, even though experience has shown that, for example, Ce:YAG and also other luminophores cannot be processed in the glass melt, as would be required in order to obtain the glass plate described here as cover. During the usual thermal treatment, there generally exists a tendency toward mutual chemical reaction between glass and luminophore, as long as the two components have not explicitly been matched to each other in this respect. Furthermore, in the specific design of the glass with its luminophore in each case, intrinsic coloration as well as demixing can ensue.

Described in EP 1 471 777 A2 is a luminophore that is activated with Ce and has a garnet structure, in which terbium and Y, Lu, Sc, La, Gd, or Sm is a main component of the host lattice.

The sealing compound used comprises polymers having all of the drawbacks already described.

DE 10 137 641 A1 describes a dome-shaped matrix for embedding luminophores, which is formed from a glassy body. Between the chip, which emits the primary light, and the dome with the embedded luminophores is found a recess, which is filled with an optically transparent medium having a high refractive index. This dome can be made of a glass, which can contain a luminophore, a fluorescing glass, or a fluorescing glass ceramic. It is described how luminophores can be fundamentally embedded in glass, but no consideration is paid to the fact that, in the case of unsuitable glasses, the luminophore is attacked during the embedding process and thereby loses its conversion properties at least partially or even entirely and the transmission properties of the glass are adversely affected by this process, and hence the efficiency of the LED can be strongly reduced, because, in this case, there is a pronounced tendency toward intrinsic coloration.

DE 102005023134 describes the use of a luminophore that is embedded in a glass matrix. Described as glass matrix are two glass families, a boron crown glass (containing, for example, 16-25% $K_2O$) and a lanthanum crown glass (containing, for example, 5-25% ThO2). In this publication also, the producibility of the glass converter system is not considered and the negative influences to be expected on the overall system, comprising primary light source and converter, are still present. Moreover, because of the boron crown glass, a negative interaction between chip and converter is to be expected on account of the high alkali content and the alkali migration, particularly at higher temperatures, into the semiconductor, which is strongly detrimental to the service life. The lanthanum crown glass mentioned there is characterized in a negative manner by the content of $ThO_2$ and is additionally expensive because of the raw materials used. Its environmental compatibility during manufacture, use, and recycling poses an additional serious problem.

U.S. Pat. No. 6,642,618 B2 describes the use of a layer made of a sol-gel glass, which has been doped with fluorescing substances, as conversion material. Coming into use as fluorescing substances are sulfides of the type (Sr,Ba,Ca) $Ga_2S_4:Eu^{2+}$. The glass, produced by a sol-gel route, contains at least one component from the group PbO, $Ga_2O_3$, $Bi_2O_3$, CdO, ZnO, BaO, and $Al_2O_3$. The sol-gel route entails, in turn, drawbacks in regard to the variability of a converter in and of itself, because only very thin layers with a thickness of less than 10 µm can be prepared in compact form.

The preparation of compact solids by the sol-gel route is possible in principle, but it is complicated because of long drying times of greater than 24 h, which result in its classification as being expensive and impractical for many important applications.

Furthermore, the known glass also contains components prohibited according to RoHS.

The abbreviation RoHS (Engl. Restriction of the use of certain hazardous substances in electrical and electronic equipment)refers to, in summary, EC Directive 2002/95/EC, prohibiting certain substances in the manufacture and processing of electrical and electronic equipment and components, as well as its respective implementation in national legislation, which maximally allows 0.01 weight percent of cadmium, maximally 0.1 weight percent of lead, mercury, hexavalent chromium, PBB, and PBDE, respectively.

This thickness of the sol-gel layers limits, in turn, the ability to be doped with luminophores and, as a result, only a greatly restricted number of reasonable color coordinates, above all those with a blue-biased color impression, can be adjusted and, accordingly, the efficiency of the system has an upper limit. On account of reduced eye sensitivity, blue fractions contribute only slightly to the overall luminosity. The composition of conventional sol-gel precursors, which, depending on their type, also contain chemically very aggressive substances (notable concentrations of mineral acids), entails at least the possibility that the chip will be damaged during its manufacture.

EP 1 605 526 A describes the use of glass plates containing embedded conversion materials as well as the division of these plates and the processing thereof to domes. The matrix glass contains at least one component from the group $GeO_2$, $TeO_2$, PbO, CaO, and $B_2O_3$. Drawbacks, however, including the aforementioned problems, include the Pb content subjected to an RoHS prohibition as well as the use of expensive $GeO_2$ and toxic $TeO_2$ raw materials.

The Patent Abstracts of Japan, Publication number: 2007-123410 describe a light-emitting diode that is covered with a highly refractive glass in which phosphors are embedded. The doped glass is obtained by joint (simultaneous) melting of pulverized glass shards and the respective phosphors. The glass used necessarily contains $TeO_2$ (40-53 mol %), $B_2O_3$ (5-30 mol %), and ZnO (3-20 mol %) as well as, optionally, $Ga_2O_3$, $Bi_2O_3$, $GeO_2$, $Y_2O_3$, $La_2O_3$, $Gd_2O_3$ (0-7 mol %), and Ta2O5. The risk of intrinsic coloration of this glass on account of the $Bi_2O_3$ and $TeO_2$ content, on the one hand, and, on the other hand, the drawbacks already mentioned above, as well as the use of expensive and in part toxic raw materials ($TeO_2$, $Ga_2O_3$, $Bi_2O_3$, $GeO_2$), which are present, in part, in high proportions, are extremely detrimental for the commercial use thereof. Furthermore, the commercial applicability thereof in special instances is placed in question on account of an elevated demixing/crystallization tendency.

The Patent Abstracts of Japan, Publication number: 2007-016171 describes a wavelength conversion material made of oxynitride glass with a softening point of 700° C. or higher and nitride-based fluorescent materials distributed therein, with the luminophores already being added in the melt or else it being possible to produce practicably the glass itself from luminophore.

The drawbacks, such as reactivity and intrinsic color, are present here as well. Elevated mutual reactivity is to be expected, in particular, in an elevated temperature regimen at temperatures of greater than 600° C. In addition, the production of oxynitride glasses is complicated and expensive in comparison to the production of silicate glasses, for example.

Disclosed in WO 2007/145047 A1 is a wavelength conversion material made of a low-melting glass containing the main components SnO, $B_2O_3$, and $P_2O_5$ and nitride-based fluorescent materials distributed therein. The glass or glass family described here tends toward coloration on account of the $P_2O_5$ content and hence is unsuitable, at least in certain compositions, for the preparation of an effective wavelength converter.

EP 1 880 983 describes a composite material, which is obtained by mixing and baking a glass powder, blended with a luminophore. The converter produced in this way achieves an energy conversion efficiency of at least 10%. The described glass contains—as do many of those already mentioned—high proportions of, for example, ZnO, $B_2O_3$, and alkalis, with the entailed drawbacks. For the described composition ranges and the described production methods, these lead, in particular, to the potential of intrinsic coloration. Hence, the efficiency of the overall system is reduced and can, if at all, lie only slightly above the claimed limit of 10%.

In summary, the prior art describes light sources based on LED or laser diode light sources having wavelength converters comprising luminophores and matrix materials, for which the matrix materials, in particular, have intrinsic weaknesses and drawbacks. In the case of polymers, these are especially their instability toward thermal load and environmental influences as well as their relatively low refractive index.

In the case of the inorganic matrix materials mentioned, these drawbacks include the following. Their chemical reactivity with the luminophores to be embedded, which, particularly in the course of the manufacturing process of the converter at elevated temperatures (glassy matrices) or at high temperatures (ceramic matrices or molten glass), has a detrimental effect on the fluorescence properties of the phosphor or abolish them (even for phosphors whose thermal stability lies above the process temperatures, such as, for example, Ce:YAG). The impairment of the luminophore during the production of the converter. The toxicity of individual components of the matrix with consequences on the ability to produce them. Special and hence expensive syntheses, which, in turn, necessitate special manufacturing methods, which allow only small volumes to be prepared and hence, in turn, act to drive up costs. The expensive composition of the matrix glass. The at least potential risk of the intrinsic color of the described matrix materials, glasses, and glass families after their annealing, melting down, or remelting from powders.

Separately or taken together, these lead to inefficient converters with low light outputs or even to functionless examples, which the inventor was able to demonstrate by the inventor's own experiments for several of the aforementioned glasses and glass families.

SUMMARY

The invention is intended to provide an inorganic wavelength conversion material having a matrix glass with at least one embedded luminophore for the production of white or colored light by additive color mixing of light of differing wavelengths or spectra of differing character in terms of their spectral curve.

This problem is solved by a conversion material having the features disclosed herein.

DETAILED DESCRIPTION

Figure 1:
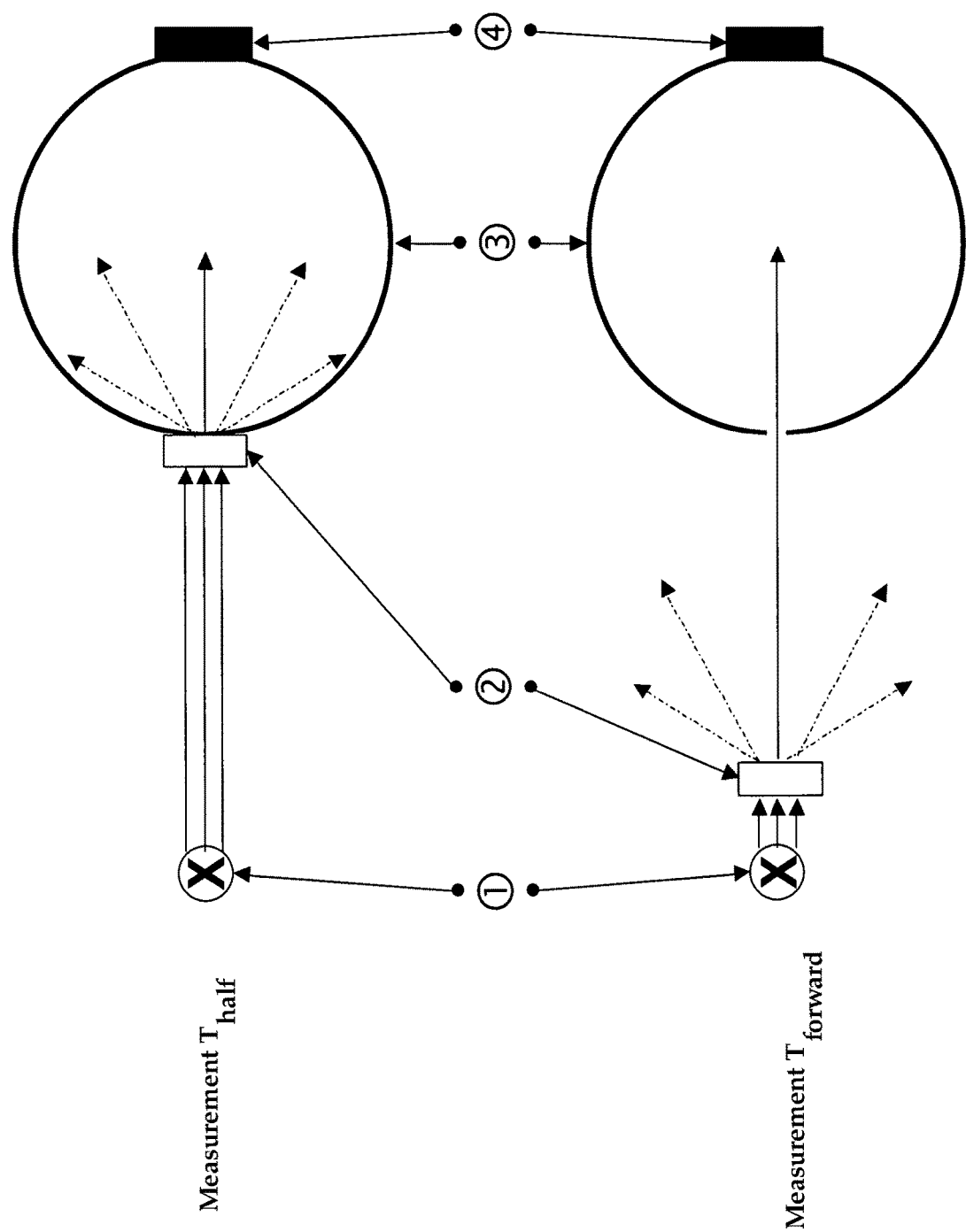
FIG. 1 illustrates a measurement of $T_{half}$ (top) and $T_{forward}$ (bottom)

This conversion material comprises a glass, which is referred to hereinafter also as the matrix or matrix glass. The starting material for the matrix glass exists in the form of a bulk/volume material or as loose powder obtained from it.

The bulk material or volume material describes the matrix glass after its production, that is, after its melting, and before the formation of a frit and/or before the grinding of the glass to a powder. Accordingly, the bulk material is a "compact" or fused glass body. It is a solid material or a body with uniform density. The bulk material can be present, for example, as a glass plate or a glass block.

Specifically present in the framework of the present invention is a conversion material, which comprises a matrix glass that, as a bulk material with a thickness d of about 1 mm, has a pure transmission $\tau_i$ of greater than 80% in the wavelength region from 350 to 800 nm and in the region in which the primary light source emits light, and wherein the matrix glass, as a sintered compact, is structured from a powder with a grain size distribution of grain sizes d10>=0.7 μm, d50>=3 μm, and d90<=150 μm. In its ready-to-use state, the conversion material comprises additionally at least one luminophore. The at least one luminophore is then embedded or incorporated in the matrix glass.

The converter is suitable, in particular, for a white or colored light source comprising a semiconductor light source as the primary light source.

The sintered compact is also referred to as a sintered glass body. It is formed by the matrix glass, which has been ground to a powder and is "bonded" by means of sintering. The matrix glass is ground. The powder is placed in a mold. The sintered compact is formed by a sintering of the powder.

The grain size distribution in accordance with the invention, d10>=0.7 μm, d50>=3 μm, and d90<=150 μm, is determined on the powder.

Preferably, the sintered compact is sintered and/or the distribution of the grain sizes is chosen in such a manner that, for the sintered compact without an embedded luminophore, the sum of transmission and reflection in the spectral region from 350 nm to 800 nm and in the spectral region in which the primary light source emits light is at least greater than 80%, preferably greater than 85%, most preferably greater than 90%.

In particular, the sintered compact is sintered and/or the distribution of the grain sizes is chosen in such a manner that, in a spectral region from 350 to 800 nm, a quotient of $Th_{half} \cdot T_{forward}$ lies at $1 < T_{half} \cdot T_{forward} < 70$. The ratio makes possible a characterization of the produced sintered compact in terms of its transmission and/or scattering behavior. For further details and for the definition of the parameters $T_{half}$ and $T_{forward}$, reference is made to the discussions below in relation to FIG. 1.

Also lying in the scope of the invention is a conversion material for a white or colored light source comprising a semiconductor light source as the primary light source, comprising a matrix glass, which, as a pure glass body, has a pure transmission $\tau_i$ of greater than 80% for a thickness d of about 1 mm in the wavelength region from 350 to 800 nm and in the region in which the primary light source emits light, as well as the sum of transmission and reflection of the ground glass obtained from powder with a grain size distribution d10>=0.7 μm, d50>=3 μm, and d90<=150 μm, a green compact obtained from it and placed in a mold, and sintered glass bodies, without luminophore, prepared afterwards by sintering, at least greater than 80% in the spectral region from 350 nm to 800 nm and in the spectral region in which the primary light source emits light, as well as the quotient of $T_{half} \cdot T_{forward}$ of this sintered compact is $1 < T_{half} \cdot T_{forward} < 70$ in the spectral region from 350 to 800 nm.

The green compact is a body made of a powder that is fed to a sintering process.

The inventors have recognized that the properties of the matrix glass as such and, in particular, of the glass powder formed from it, which, after sintering, forms the matrix for the embedded luminophore, exerts a decisive influence on the optical properties of the converter.

The inventors have recognized, on the one hand, that the size and distribution of the grain size of the matrix glass exerts a substantial influence on the optical properties of the sintered matrix glass (undoped) and the converter element (doped with phosphor). On the other hand, the inventors have also recognized that the chosen size of the grains, tending toward larger diameters, exerts an advantageous influence on the optical properties of the sintered matrix glass (undoped) and the converter element (doped with phosphor). This contrasts with the prior art, according to which an attempt was rather made to supply a powder with a small grain size—for example, one with a mean diameter d50 of less than about 2.5 µm.

The prevailing opinion in this case proceeds from the assumption that grains that are too coarse lead to increased porosity in a sintered compact, so that this would produce an effect of massive, uncontrollable scattering centers, and hence it would be expected that the result would be an optical regimen of the converter element that could not be adjusted in a controlled manner. The efficiency of a body or converter element produced in this way would drop to an unsatisfactory level.

The inventors have found, by contrast, that, by means of the grain size distribution in accordance with the invention, the optically relevant regimen, made up of transmission, reflection, absorption, and/or scattering, can be adjusted or modified in a targeted manner. Additionally, they have found that the large or coarse grains lead, as a result, to nearly transparent sintered compacts and, moreover, are more readily sinterable.

Coming into use as a transparent matrix in the present invention, in a first group of preferred embodiments, is a glass whose thermal expansion coefficient lies between 3 and $11 \cdot 10^{-6} K^{-1}$ and whose refractive index $n_d$ assumes values above 1.6 or equal to 1.6.

The matrix glass is further characterized in that the phosphor used (for example, Ce:YAG) is not at all attacked or dissolved out or not to a notable extent during the melting/annealing/sintering, which would result in at least a restriction or total loss of its functionality.

The body obtained after melting/annealing/sintering is to be referred to below also as a sintered compact or else as converter or conversion material.

The composition of the matrix glass is free of toxic and/or environmentally questionable components.

In the use state of the conversion material, the conversion material comprises at least one luminophore with a grain size having a mean diameter d50 between 1 µm and 50 µm, especially preferably between 1 µm and 20 µm, most preferably between 1 µm and 15 µm.

In an alternative or supplemental embodiment of the invention, the conversion material comprises at least one luminophore with a grain size having a mean diameter d50 of less than 300 nm, especially preferably less than 100 nm, and most preferably less than 40 nm.

The primary radiation is absorbed through the addition of the luminophore. The secondary radiation produced, as well as the primary radiation, is additionally scattered. In order to ensure an adequate absorption and hence conversion of the primary radiation, the scattering of the primary radiation should not be too large. This is achieved either by relatively large luminophore particles (d50 between 1 µm and 50 µm, especially preferably between 1 µm and 20 µm, and most preferably between 1 µm and 15 µm) or else by nanoscale particles (d50 less than 300 nm, especially preferably less than 100 nm, and most preferably less than 40 nm). If the luminophore particles are too large, they are difficult to process in the sintering process. In addition, the practicable particle size has an upper limit dictated by the thickness of the conversion element (typically <250 µm).

Also lying in the scope of the invention is a method for producing the conversion material. The production takes place preferably by way of melting the glass raw materials, formation of a frit (or thin shards) by pouring the melt into, for example, water (or between cooled rollers), grinding of the frit to a glass powder, treatment of the matrix glass powder with fluorescence substances (phosphors), and thermal treatment, such as, for example, sintering, to form a new glass body/glass matrix composite material, the converter. The grinding of the matrix glass to a powder takes place in such a manner that the powder has a grain size distribution of grain sizes d10>=0.7 µm, d50>=3 µm, and d90<=150 µm.

The method is particularly suitable for the production of a conversion material in accordance with the invention.

In one embodiment, the sintering takes place in a specific atmosphere. The specific atmosphere is preferably supplied by nitrogen, forming gas, and/or argon or as a reduced pressure, such as, for example, as a vacuum of down to $10^{-6}$ mbar. This type of process design protects the luminophore against external influences, such as, for example, against oxidation or reduction. In addition, the embedding in certain glasses is thereby made possible at all. Furthermore, it is also possible in this way to adjust certain redox states in the matrix glass and/or the luminophore. By sintering at reduced pressure, it is possible to minimize or adjust the number and/or the size of possible pores. In an alternative or supplement, this can also be achieved by pressure sintering (uniaxially or isostatically), whereby the adjustment of specific atmospheres is to be observed in accordance with advantageous parameters for the material combinations to be processed. This takes place at a pressure in a range from 100 to 3000 bar, preferably from 500 to 2500 bar, most preferably from 500 to 1500 bar. This thermal treatment takes place, in turn, in a temperature range of up to approximately 150 K above the softening temperature (EW) of the glass or in such a way that the viscosity of the employed glass lies in a range between $h=10^{14}$ dPas and $h=10^6$ dPas, preferably between $h=10^{13.5}$ dPas and $h=10^7$ dPas, especially preferably between $h=10^{10}$ dPas and $h=10^7$ dPas. The annealing in this case can be carried out with a dwell time in a range of 0 to 300 min, preferably 15 to 300 min, especially preferably 100 to 180 min.

The luminophores—for example, Ce:YAG—are used with a grain size having a mean grain diameter d50 between 1 µm and 50 µm, especially preferably between 1 µm and 20 µm, most preferably between 1 µm and 15 µm. In an alternative or supplement, the luminophore is used with a grain size having a mean grain size diameter d50 of less than 300 nm, especially preferably less than 100 nm, and most preferably less than 40 nm.

In another embodiment of the method, the luminophores are subjected to a pretreatment, preferably thermal pretreatment. The temperatures are to be chosen depending on the type of luminophore. Preferably, the pretreatment takes place in a specific atmosphere. This is supplied, in particular, by nitrogen, forming gas, and/or argon or as a reduced pressure—for example, as a vacuum of down to $10^{-6}$ mbar.

In another embodiment of the invention, a protective layer, for example, for protection against chemical attack of the phosphor by the glass and vice versa during the sintering or one provided as a barrier layer against, for example, moisture in the LED system, is formed on the surface or outer side with the luminophore. This takes place prior to the blending with the matrix glass. This protective layer "shields" the luminophore from environmental influences and/or thermal influences. The luminophore is encapsulated. As a result, a degradation of the luminophore can be prevented or at least reduced. The protective layer optionally can be inorganic. It is formed or deposited, for example, by means of wet-chemical methods, sol-gel methods, PVD and/or CVD.

As an alternative or supplement, an end-processed and post-processed conversion element may also be furnished with a protective layer in accordance with one of the aforementioned methods, for example. A barrier layer against moisture, for example, represents one possible embodiment for a protective layer.

In an enhancement of the method, an additional temperature-assisted and, optionally, pressure-assisted (uniaxial or isostatic) treatment of the sintered compact takes place after sintering. As a result, the optical regimen of the conversion material or the undoped sintered matrix glass, already described above, is further optimally adjusted, and a solid composite is achieved and/or possible tensions are eliminated.

In one embodiment, the mentioned additional annealing is a second sintering. The further anealing is carried out preferably at a pressure in a range from 250 to 2500 bar, preferably from 500 to 1500 bar. Furthermore, the additional annealing is carried out at a temperature such that the viscosity of the employed glass lies in a range between $h=10^{14}$ dPas and $h=10^6$ dPas, preferably between $h=10^{13.5}$ dPas and $h=10^7$ dPas, especially preferably between $h=10^{10}$ dPas and $h=10^7$ dPas. The additional annealing is carried out in this case with a dwell time in a range from 30 to 600 min, preferably from 60 to 300 min, especially preferably from 100 to 180 min.

The glass matrix is further characterized in that, even as a pure, compact, fused glass body or a glass plate (also referred to above as bulk material), it has no intrinsic color from the above process and hence both primary light and secondary light are unchanged in an ideal way; this means that they are supplied for the color mixture without attenuation or spectrally changed by absorptions.

Accordingly, in general, this thereby takes into consideration the conversion of light of a wavelength $w_1$ or of a spectral wavelength region $w_1$ to light of a wavelength $w_n$ of a spectral wavelength region $w_2$ or, when n luminophores are used, to light of the wavelength $w_n$ or of a spectral wavelength region $w_n$, in order to obtain, in the sum, light with the fundamental spectral distribution $z_1*w_1+z_2*w_2+\ldots+z_n*w_n$, the factor z giving the proportions and color strengths of the associated wavelengths or wavelength regions that are involved in the color mixture.

On the basis of a primary light source, such as, for example, an LED (light-emitting diode) or LD (laser diode), the spectrum of which emits, at least partially, light corresponding to the excitation spectra of the luminophores, this leads to the emission of light of other wavelengths. The light source employed can, but need not, contribute to the mixture with its own light, which, at least in part, has not been converted to other wavelengths.

Accordingly, it is advantageous also to provide an inorganic matrix material/matrix glass, which is thermally and chemically stable and stable to environmental influences; does not contain any environmentally questionable components or any components questionable to health; can be prepared without complicated methods in bulk and hence inexpensively; behaves chemically inertly toward the luminophores to be embedded (and vice versa); essentially does not have any intrinsic color in the formation as a matrix for conversion material (1) without luminophore and (2) has a low reflection (back scattering) with luminophores in the spectral region of its absorption bands, in particular for the grain size distributions in accordance with the invention.

Specifically, the matrix glass, as a bulk material/glass, has a high pure transmission $\tau_i > 80\%$ for radiation through matrix glass with a thickness of d=1 mm, essentially without absorption bands in the wavelength region from 350 to 800 nm, and the sum of transmission and reflection of the matrix glass, solely sintered (that is, undoped), in the spectral region preferably from 350 nm to 800 nm (including the spectral region of the primary light source or the primary light sources), is at least >80%, preferably >85%, most preferably >90%, and/or the maximum and minimum contributions to the difference of reflection and transmission established over these spectral regions do not differ by more than 40%, preferably by no more than 25%, and most preferably by no more than 15%, and/or that the reflection of the matrix glass doped with luminophores in the sintered state, in the spectral region of the primary light source, is <30%, preferably <25%, most preferably <15%, and/or that the sum of transmission and reflection of the matrix glass doped with luminophores in the sintered state, in the spectral region from 350 nm to 800 nm, excluding the spectral region of the primary light sources, is at least >80%, preferably >85%, most preferably >90%, and/or the maximum and minimum contributions to the difference of reflection and transmission established over these spectral regions do not differ by more than 40%, preferably by no more than 25%, and most preferably by no more than 15%, and/or has, for a first group of preferred embodiments, a refractive index greater than or equal to 1.6.

Accordingly made possible, without limiting the generality in regard to the generation of further light colors, is the conversion of blue to yellow light, so as to obtain, in the sum, white light or the physiological color impression of white light. White light refers in the following not only to the complete spectrum of visible light, but rather, in particular, also to any kind of light that produces, at least in humans, the impression of white light.

In particular, the invention comprises preferably the conversion of blue light of a primary light source to yellow light by means of a luminophore in order to obtain, in the sum, the color impression of white light. A special case is the manufacture of a light source based on a blue LED and a luminophore of the type Ce:YAG (with emission in the wavelength region around 560 nm) and sensed as white.

Conversion of blue light by means of at least one appropriate luminophore in each case to yellow and/or red and/or green light in order to obtain, in the sum, white light (in the mixture of RGB or RGGB).

Conversion of blue light by means of at least one appropriate luminophore in each case into yellow and/or red and/or green light in order to obtain, in the sum, light of a specific color.

Preferred luminophores contain, as host material, at least one substance from the group comprising oxides, nitrides, oxynitrides, sulfides, oxysulfides, halides, halooxides, halosulfides, tellurides, and selenides, with the host material being doped with at least one substance from the group containing rare earths (Ce, Eu, Tb, Gd, . . . ), transition metals (Cr, Mn), and heavy metals (Tl, Pb, Bi).

In the conversion of UV light in the described cases, one additional luminophore, which emits in the blue spectral region, is required in each case.

Glasses and glass families of a first group. A first group of preferred matrix glasses in accordance with the invention has the following properties. A refractive index that is greater than or equal to 1.6, with the matrix glass having a refractive index greater than or equal to 1.6, preferably 1.65-2.0, preferably 1.8-1.95, and hence is matched to the luminophores (specifically, Ce:YAG n~1.8).

For which the difference in the refractive index of the material of the semiconductor element is "minimized," this refractive index being, for example, 1.8 (sapphire), 2.5 (GaN or InGaN) to 3.5 (AlInGaP), depending on the configuration of the semiconductor element. In particular, in direct contact of converter and semiconductor element, this matching is important insofar as possible in order to couple light efficiently into the converter.

The matrix glass has essentially no intrinsic color, which comprises that the matrix glass, as bulk material/glass, has a high pure transmission $\tau_i$>80% at d=1 mm without absorption bands in the wavelength region from 350 to 800 nm, that the sum of transmission and reflection of the base glass/glass matrix, solely sintered (that is, undoped), in particular for the grain size distribution in accordance with the invention, d10>=0.7 μm, d50>=3 μm, and d90<=150 μm, in the spectral region from 350 nm to 800 nm (including the spectral region of the respective primary light source) is at least >80%, preferably >85%, most preferably >90%, with the region of the spectrum within which the primary light source emits light being referred to as the spectral region of the primary light source, as well as that the maximum and minimum contributions of the difference of reflection and transmission established over these spectral regions does not differ by more than 40%, preferably by no more than 25%, and most preferably by no more than 15%, that the reflection of the matrix glass doped with luminophores in the sintered state, in the spectral region of the primary light source, is <30%, preferably <25, most preferably <15%, and that the sum of transmission and reflection of the matrix glass doped with luminophores in the sintered state, in the spectral region from 350 nm to 800 nm, excluding the spectral region of the primary light sources, is at least >80%, preferably >85%, most preferably >90%, as well as that the maximum and minimum contributions of the difference of reflection and transmission established over these spectral regions does not differ by more than 40%, preferably by no more than 25%, and most preferably by no more than 15%.

Also advantageous for the matrix glasses in accordance with the invention is a converter thickness that can be adjusted in wide ranges (approximately 30 μm to several 1000 μm): this leads to a greater freedom of design for the provision of highly efficient conversion materials, because the density and absolute quantity of luminophore can then be varied independently and hence the color coordinate and efficiency of the light source furnished with the matrix glass and the primary light source can be adjusted optimally.

Very advantageous is also the chemical inertness toward the phosphors to be embedded and vice versa, which means the chemical inertness of the phosphors or luminophores to be embedded relative to the matrix glass.

Of great advantage, furthermore, is when the glass matrix and the luminophores are not only inert toward one another, but also do not react with one another at elevated temperatures or, in the case of a reaction, the luminophore properties are not negatively influenced. This is true both in the case of production of the converter and during the operation of the resulting light source.

Advantageous also is the ability to carry out the process in established industrial processes, which allow simple, near-end-form manufacture or manufacture of end forms at plausible costs as well as special realizations of a converter (for example, gradients in the luminophore doping, additional optical elements).

The following glasses and glass families fulfill the requirements in accordance with the invention quite well in a surprising manner.

Lanthanum borosilicate glasses with a zinc fraction, aluminum borosilicates with an yttrium fraction, and alkaline-earth silicates.

Sample glasses are:

N-LaSF40 (SCHOTT AG), N-LASF46 (SCHOTT AG)

P-LaSF47 (SCHOTT AG), K-VC89 (Sumita),

N-KzFS5(SCHOTT AG), S-NBH5 (Ohara),

N-KzFS8(SCHOTT AG), $Y_2O_3$-containing glasses (SCHOTT AG) with $n_d$ greater than or equal to 1.6: N-LAK9, N-LAK33A, N-LAK34, N-LAF2, N-LAF7, N-LAF21, N-LAF34, N-LASF44, P-LASF47, and K-LAFK60 (Sumita)

Furthermore, it is advantageously possible with the present invention to provide, among other things, a glass matrix for conversion materials, with which, in particular also on account of ecological considerations, without the use of $Tl_2O_2$, $TeO_2$, and $As_2O_3$ and preferably also without the component $Bi_2O_3$, desired and advantageous optical properties ($n_d/v_d$) are made possible at simultaneously lower processing temperatures.

These glasses should not have any haze, crystallization, and intrinsic coloration as the matrix glass and should, furthermore, be sinterable without intrinsic color and be as little chemically reactive as possible toward the later contained luminophores.

For a first group of matrix glasses in accordance with the invention, these have a refractive index $n_d$ of $n_d$>=1.6 and preferably a lower processing temperature. They should also be easy to melt and to process as well as have an adequate devitrifying stability, which makes possible a production of glasses in continuously running assemblies.

Provided, in particular, is an arsenic-free and preferably $Bi_2O_3$ free glass with a refractive index $n_d$ of $n_d$≥1.6, which comprises the following components (in wt % based on oxide).

The following table comprises Examples 2 to 4 of the first group.

| | |
|---|---|
| $SiO_2$ | 3-7 |
| $B_2O_3$ | 16-22 |
| $Al_2O_3$ | 0-1 |
| ZnO | 3-26 |
| $TiO_2$ | 1-11 |
| $ZrO_2$ | 1-8 |
| $La_2O_3$ | 32-45 |
| $Nb_2O_5$ | 5-16 |
| $WO_3$ | 0-7 |
| $Y_2O_3$ | 0-5 |
| BaO | 0-6 |
| MgO | 0-6 |
| CaO | 0-6 |
| SrO | 0-6 |
| Sum of alkaline-earth oxides | 0-10 |
| Refining agent | 0-2 |

The following table comprises Example 5 of the first group:

| | |
|---|---|
| SiO$_2$ | 1-5 |
| B$_2$O$_3$ | 29-35 |
| Al$_2$O$_3$ | 20-26 |
| Y$_2$O$_3$ | 35-45 |
| ZnO | 0-6 |
| TiO$_2$ | 0-6 |
| ZrO$_2$ | 0-6 |
| La$_2$O$_3$ | 0-6 |
| Nb$_2$O$_5$ | 0-6 |
| WO$_3$ | 0-6 |
| BaO | 0-6 |
| MgO | 0-6 |
| CaO | 0-6 |
| SrO | 0-6 |
| Sum of alkaline-earth oxides | 0-10 |
| Refining agent | 0-2 |

The following table comprises Example 6 of the first group:

| | |
|---|---|
| SiO$_2$ | 37-45 |
| Al$_2$O$_3$ | 3-7 |
| Na$_2$O + K$_2$O | 8-12 |
| BaO | 22-<30 |
| ZnO | 5-10 |
| ZrO$_2$ | 2-7 |
| La$_2$O$_3$ | 2-<4 |
| P$_2$O$_5$ | 0-6 |
| MgO + CaO | 0-8 |
| Refining agent | 0-2 |

Preferably

| | |
|---|---|
| SiO$_2$ | 39-45 |
| Al$_2$O$_3$ | 3-7 |
| Na$_2$O + K$_2$O | 8-12 |
| BaO | 24-<30 |
| ZnO | 5-10 |
| ZrO$_2$ | 2-7 |
| La$_2$O$_3$ | 2-<4 |
| P$_2$O$_5$ | 0-6 |
| MgO + CaO | 0-8 |
| Refining agent | 0-2 |

The glass in accordance with the invention is preferably also free of coloring and/or optically active, as well as laser-active, components.

In particular, the glass in accordance with the invention is preferably free of components that are sensitive to oxidation, such as, for example, Ag$_2$O or Bi$_2$O$_3$, and/or free of toxic components or components hazardous to health, such as, for example, the oxides of Tl, Te, Be, and As.

In accordance with another embodiment of the present invention, the glass mentioned in this description and in the claims is also preferably free of other components not mentioned in the claims; that is, in accordance with such an additional embodiment, the glass essentially comprises the mentioned components. The expression "essentially comprises" means in this case that other components are present at most as impurities, but are not added intentionally to the glass composition as individual components.

The glass in accordance with the invention can contain conventional refining agents in small amounts. Preferably, the sum of the added refining agents is at most 2.0 wt %, more preferably at most 1.0 wt %. As refining agent, the glass in accordance with the invention can contain at least one of the following components (in wt %, additively to the remaining glass composition):

| | | |
|---|---|---|
| Sb$_2$O$_3$ | 0-1 | And/or |
| As$_2$O$_3$ | 0-1 | And/or |
| SnO | 0-1 | And/or |
| SO$_4^{2-}$ | 0-1 | And/or |
| Cl$^-$ | 0-1 | And/or |
| F$^-$ | 0-1 | |

Fluorine and fluorine-containing compounds also tend to vaporize during the melting and fusing operation and during the sintering process and, as a result, make more difficult a precise adjustment of the glass composition or, after sintering, the glass matrix. The glass in accordance with the invention is therefore preferably also free of fluorine.

The tables contain exemplary embodiments in the preferred composition ranges. The glasses described in the examples were produced using different process parameters, which are associated with the physical properties of the glasses.

Exemplary Embodiments of the Production of Matrix Glasses

Production Example 6

The raw materials for the oxides are weighed, one or more refining agents, such as, for example, As$_2$O$_3$, are added, and subsequently well mixed. The glass quantity is fused at approximately 1330° C. in a discontinuous melting assembly and afterwards refined (1380° C.) and homogenized. At a pouring temperature of about 1380° C., the glass can be poured and processed to the desired dimensions as, for example, ribbons. In large-volume, continuous assemblies, the temperatures can be lowered, according to experience, by at least approximately 100 K.

Ribbons are obtained by pouring the glass over two rollers. They can be better ground to powder, a precursor for sintering, than shards.

TABLE 1

Melt example for 100 kg of calculated glass (according to Example 6)

| Oxide | wt % | Raw material | Weighed amount (g) |
|---|---|---|---|
| SiO$_2$ | 39.9 | SiO$_2$ | 39880.35 |
| Al$_2$O$_3$ | 5.0 | Al(OH)$_3$ | 7669.3 |
| Na$_2$O | 10.0 | Na$_2$CO$_3$ | 17099.59 |
| ZnO | 8.0 | ZnO | 7976,07 |
| ZrO$_2$ | 5.0 | ZrO$_2$ | 4985.04 |
| BaO | 25.9 | BaCO$_3$ | 33621.56 |
| | 1.0 | Ba(NO$_3$)$_2$ | 1688.70 |
| La$_2$O$_3$ | 5.0 | La$_2$O$_3$ | 5030.32 |
| As$_2$O$_3$ | 0.3 | As$_2$O$_3$ | 299.10 |
| Sum | 100.1 | | 118250.04 |

The properties of the glass thus obtained are presented in the following table as Example 6.

TABLE 2

Exemplary embodiments of the glass matrix for the conversion material

| Oxides | Example | | | | |
|---|---|---|---|---|---|
| | 2 | 3 | 4 | 5 | 6 |
| $SiO_2$ | 5.3 | 5.4 | 5.6 | 2.8 | 40 |
| $B_2O_3$ | 18.5 | 19.6 | 18.1 | 32.1 | |
| $Al_2O_3$ | | | | 23.5 | 5.0 |
| $Na_2O$ | | | | | 10.0 |
| PbO | | | | | |
| ZnO | 22.1 | 23.5 | 4.9 | | 8.0 |
| BaO | | | 2.1 | | 27 |
| $TiO_2$ | 2.7 | 4.2 | 8.8 | | |
| $ZrO_2$ | 2.9 | 3.0 | 6.0 | | 5.0 |
| $La_2O_3$ | 35.5 | 36.8 | 42.3 | | 5.0 |
| $Nb_2O_5$ | 7.4 | 7.9 | 12.3 | | |
| $WO_3$ | 5.1 | | | | |
| $Y_2O_3$ | | | | 41.6 | |
| $n_d$ | 1.834 | 1.834 | 1.901 | 1.6641 | 1.6001 |
| CTE $(20\text{-}300°\ C.)$ $[10^{-6}/K]$ | 6.9 | 6.9 | 7.2 | 6.97 | 10.8 |
| Tg [° C.] | 585 | 590 | 645 | 684 | 541 |
| T (h = $10^{7.6}$ dPas) [° C.] | 673 | 677 | 735 | | 742 |
| T (h = $10^4$ dPas) [° C.] | 786 | | 852 | | 983 |

Preferred exemplary embodiments of the method of production of the conversion material The examples described below both of the first group and of the second group of embodiments in accordance with the invention are subject to essentially the same method of production in each case.

Powders of the starting glasses, ground to a grain size having a distribution of d10>=0.7 μm, d50>=3 μm, and d90 <=150 μm, are weighed with a luminophore—for example, Ce:YAG having a grain size with a mean diameter d50 between 1 μm and 50 μm, especially preferably between 1 μm and 20 μm, most preferably between 1 μm and 15 μm, based on weight percent—and blended in a mixing assembly—for example, a Turbula tumbling mixer (model T2C/Willi A. Bachofen company/Basel) or Speedmix (model DAC 150 FVZ/Hauschildt Engineering)—for 1 to 120 min, preferably 1 to 5 min (Speedmix) or 15 to 120 min (Turbula), most preferably 1 to 3 min (Speedmix) or 60 to 120 min (Turbula).

Here, the D50 or else median value is the value that gives a grain size at which 50% of the particles are finer and 50% are coarser that this given value.

There also exist nanoscale phosphors, that is, luminophores with outer dimensions in the range of several nanometers, in particular of less than 100 to 200 nm, that can also be used.

The powder mixture or else the pure glass powder is subsequently taken in portions in such a way that a powder body having a diameter of approximately 10 mm, preferably 5 mm, most preferably less than 5 mm, but at least 1 mm, and a height of approximately 3 mm or 1 mm or 0.5 to 0.1 mm can be prepared.

The bulk is deposited on a thermally stable substrate in, for example, a tube- or ring-shaped element that delimits the bulk and is compacted manually and/or fed uniaxially (for example, press of the Paul Weber company; Model PW40) and/or cold-isostatically (press of the Paul Weber company; Model KIP500E) to a pressing process, which can be optimally designed by addition of convention processing auxiliaries. The pressure range for the uniaxial pressing lies at 100 to 5000 bar, preferably 500 to 2500 bar. This takes place in such a manner that, subsequently, the outer delimitation can be removed.

Afterwards, the annealing of the samples takes place at temperature and time regimens (heating rates and dwell times) that are appropriate for the matrix glasses in terms of their softening temperature. Depending on the slope of the viscosity curve of the glass and without general restriction, the target temperatures T of the annealing lie in the range between the EW (softening temperature) and Va (processing temperature), usually in a regimen of EW+150 K, or such that the viscosity of the employed glass lies in the range between h=$10^{14}$ dPas and h=$10^6$ dPas, preferably between h=$10^{13.5}$ dPas and h=$10^7$ dPas, especially preferably between h=$10^{10}$ dPas and h=$10^7$ dPas.

The heating takes place such that it is possible to assume an equilibrated temperature level in the oven and for the bulk or, as the case may be, several bulks.

In particular, the time regimen to be chosen in this case depends typically on the type, size, and design (also the control) of the annealing assembly. In the present oven (Nabertherm model N70/H; Naber C16 control and Eurotherm model 2604), heating rates of from 1 K/min to 30 K/min, preferably 1 K/min to 20 K/min, most preferably 1 K/min to 10 K/min, to the target temperature and dwell times before cooling with oven characteristic curve of 0 to 60 min, preferably 0 to 30, most preferably 10 to 30 min, have proven useful.

After the annealing or annealings, the composite bodies thus created, comprising glass matrix and at least one luminophore, are post-processed, with grinding and/or polishing agents of grain size <1 μm (single sided) being used, so that, as a result, surfaces that are raw on both sides or on one side or are polished are present.

The measurement of the optical data for reflection and transmission took place in a conventional spectrometer (for example, Perkin Elmer Lambda 9 or 900), with sample in front of (transmission) or in back of (reflection) an integration sphere, in the wavelength region from 250 to 2500 nm, at least, however, in the region from 300 to 800 nm, in order to determine the aforementioned parameters. The determination of the parameters $T_{half}$ and $T_{forward}$ also takes place by means of the integration sphere. For further details, reference is made to the discussions in regard to FIG. 1.

The internal conversion quantum yield of the luminophores embedded in the glass matrix was reduced in relation to the internal conversion quantum yield of the non-embedded luminophores by not more than 20%, preferably by not more than 10° A, and most preferably by not more than 5%. The internal conversion quantum yield was measured in each case by means of the decay time of excited optical transitions in the luminophores.

TABLE 3

| | Example | | | | | | | |
|---|---|---|---|---|---|---|---|---|
| | A | B | C | D | E | F | G | H |
| Glass type/ | Ex. 2 | Ex. 2 | Ex. 2 | Ex. 2 | Ex. 3 | Ex. 3 | Ex. 4 | Ex. 6 |
| Fraction wt % | 100 | 98 | 92.5 | 85 | 95 | 90 | 90 | 90 |
| Luminophore 1/ Fraction wt % | 0 | 2 | 5 | 15 | 5 | 10 | 10 | 10 |
| Luminophore 2/ Fraction wt % | 0 | 0 | 2.5 | 0 | 0 | 0 | 0 | 0 |
| Temperature/° C. | 700 | 700 | 700 | 700 | 650 | 650 | 743 | 770 |
| Ramp/K/min | 1 | 1 | 1 | 1 | 15 | 15 | 1 | 1 |
| Dwell time/min | 0 | 0 | 10 | 5 | 45 | 60 | 0 | 5 |
| Thickness undoped/mm | 1.5 | 1.5 | 1.5 | 1.5 | 0.5 | 0.5 | 1.5 | 1.5 |
| Reflection + Transmission undoped/%; for Vis (380-780 nm) incl. PL 404 . . . 460 nm | 82 + 10 = 92 | 82 + 11 = 93 | 81 + 9 = 90 | 83 + 11 = 94 | 89 + 5 = 94 | 88 + 7 = 95 | 75 + 10 = 85 | 80 + 7 = 87 |
| Intrinsic color undoped | None | None | None | None | None | None | None | None |
| Thickness doped/mm | — | 0.5 | 0.5 | 0.2 | 0.5 | 0.3/0.5 | 0.5 | 0.5 |
| Reflection doped At PL 460 nm | — | 29% | 11% | 15% | 21% | 2 Example 9%/11% | 22 | 17 |
| Reflection + Transmission doped/%; Thickness/mm for Vis (380-780 nm) excluding PL | — | 79 + 11 = 90 | 78 + 10 = 88 | 80 + 14 = 94 | 81 + 8 = 89 | 73 + 19 = 92/ 78 + 10 = 88 | 70 + 11 = 81 | 73 + 11 = 84 |

Glasses and glass families of a second group. The following described glasses and glass families of a second preferred group of exemplary embodiments fulfill the requirements in accordance with the invention as well, but have a refractive index that is less than 1.6.

The refractive index of these glasses lies preferably at 1.43 to 1.6 and most preferably at 1.45 to 1.49. As a result, these glasses are matched relatively well to the refractive index of the light sources/units of surrounding polymers (epoxies or silicones, including polymer with $n_d$ between 1.3 and 1.6).

Furthermore, the difference from the refractive index of air, which is, ultimately, the medium surrounding the entire light source system, is markedly reduced.

This matching is important in indirect contact of converter material to semiconductor element and further surrounding (components) elements in order to out-couple efficiently exciting light from the converter (for example, the light of a blue LED), which passes through the converter, as well as light generated in the converter. Here, indirect contact is understood to mean an arrangement without direct mechanical contact; this means, in particular, that the evanescent fields of the disseminating light, which surround the respective materials, do not measurably overlap at all or essentially not at all.

Preferable glasses of this group comprise, for example, zinc phosphates, borosilicates, aluminum borosilicates, and alkaline-earth silicates.

Sample glasses are:
BF33/BF40 (SCHOTT AG), Pyrex (Corning)
8250 (SCHOTT AG)
AF32 (SCHOTT AG), AF37 (SCHOTT AG), AF45 (SCHOTT AG), 1737 (Corning), Eagle 2000 (Corning), Eagle XG (Corning)
N-SK 57 (SCHOTT AG)
D263 (SCHOTT AG)
Optical glasses K-PBK40 (Sumita), K-CSK120 (Sumita), P-SK5 (Hikari), K-PSK50 (Sumita),
D-K9L (GDGM), D-ZK2(GDGM), D-ZK3 (GDGM)

Advantageously provided with the present invention is, among other things, a glass matrix for conversion materials, with which, particularly on account of ecological considerations, without the use of $Tl_2O$, $TeO_2$, and $As_2O_3$ and preferably also without the component $Bi_2O_3$, desired and advantageous optical properties ($n_d/v_d$) are made possible at simultaneously low processing temperatures.

These glasses have no haze, crystallization, and intrinsic coloration as matrix glass and, furthermore, are sinterable without intrinsic coloration. In this case, these glasses are only slightly chemically reactive toward the luminophores used.

Furthermore, these glasses are easy to melt and to process and have an adequate demixing and crystallization stability, which makes possible a manufacture of glasses in continuously operating assemblies.

In particular, an arsenic-free and preferably $Bi_2O_3$-free glass with a refractive index glass $n_d$ of $n_d<1.6$ provided, which comprises the following components (in wt % based on oxide).

The following table comprises Example 1 of the second group:

| P2O5 | 44-55 |
|---|---|
| B2O3 | 0-8 |
| Al2O3 | 0-5 |
| ZnO | 22-32 |
| La2O3 | 0.5-5 |
| BaO | 4-13 |
| Na2O | 5-15 |
| K2O | 0-8 |
| MgO | 0-5 |
| CaO | 0-5 |
| Sum of alkali oxides | <=15 |
| Sum of alkaline- earth oxides | <=8 |

Preferably

| | |
|---|---|
| $P_2O_5$ | 46-53 |
| $B_2O_3$ | 0-5 |
| $Al_2O_3$ | 0-3 |
| ZnO | 24-31 |
| $La_2O_3$ | 0.5-4 |
| BaO | 4-11 |
| $Na_2O$ | 6-13 |
| $K_2O$ | 0-6 |
| MgO | 0-4 |
| CaO | 0-4 |
| Sum of alkali oxides | <=13 |
| Sum of alkaline-earth oxides | <=5 |
| Refining agent | <=2 |

The following table comprises Example 2 of the second group:

| | |
|---|---|
| SiO2 | 40-44 |
| B2O3 | 14-16 |
| Al2O3 | 3-6 |
| ZnO | 2-4.5 |
| TiO2 | 0.1-0.5 |
| BaO | 23-27 |
| SrO | 0.1-1 |
| $Li_2O$ | 5.5-<7 |
| $Na_2O$ | 2-4 |
| $K_2O$ | 0-4 |

Preferably

| | |
|---|---|
| $SiO_2$ | 41-43 |
| $B_2O_3$ | 14-16 |
| $Al_2O_3$ | 3.5-6 |
| ZnO | 2.5-4 |
| $TiO_2$ | 0.1-0.5 |
| BaO | 23-27 |
| SrO | 0.3-1 |
| $Li_2O$ | 5.5-6.5 |
| $Na_2O$ | 2-4 |
| $K_2O$ | 0-6 |

The following table comprises Example 3 of the second group:

| | |
|---|---|
| $SiO_2$ | >58-65 |
| $B_2O_3$ | >6-10.5 |
| $Al_2O_3$ | >14-25 |
| ZnO | 0-<2 |
| BaO | >3-5 |
| MgO | 0-<3 |
| CaO | <=9 |
| MgO + CaO + BaO | >=8 |
| $ZrO_2$ | 0-2 |
| $TiO_2$ | 0-2 |
| $ZrO_2 + TiO_2$ | 0-2 |
| $As_2O_3$ | 0-1.5 |
| $Sb_2O_3$ | 0-1.5 |
| $CeO_2$ | 0-1.5 |
| $Cl^-$ | 0-1.5 |
| $F^-$ | 0-1.5 |
| $SO_4^{2-}$ | 0-1.5 |
| $As_2O_3 + Sb_2O_3 + SnO_2 + CeO_2 + Cl^- + F^- + SO_4^{2-}$ | <1.5 |

Preferably

| | |
|---|---|
| $SiO_2$ | >58-65 |
| $B_2O_3$ | >8-10.5 |
| $Al_2O_3$ | >18-20.5 |
| ZnO | 0.1-<2 |
| BaO | >3-4 |
| MgO | 0-<3 |
| CaO | -<=9 |
| MgO + CaO + BaO | >=8 |
| $ZrO_2$ | 0-2 |
| $TiO_2$ | 0-2 |
| $ZrO_2 + TiO_2$ | 0-2 |
| $As_2O_3$ | 0-1.5 |
| $Sb_2O_3$ | 0-1.5 |
| $CeO_2$ | 0-1.5 |
| $Cl^-$ | 0-1.5 |
| $F^-$ | 0-1.5 |
| $SO_4^{2-}$ | 0-1.5 |
| $As_2O_3 + Sb_2O_3 + SnO_2 + CeO_2 + Cl^- + F^- + SO_4^{2-}$ | <1.5 |

The following table comprises Example 5 of the second group:

| | |
|---|---|
| $SiO_2$ | 55-79 |
| $B_2O_3$ | 3-25 |
| $Al_2O_3$ | 0-10 |
| $Li_2O$ | 0-10 |
| $Na_2O$ | 0-10 |
| $K_2O$ | 0-10 |
| $Li_2O + Na_2O + K_2O$ | 0.5-16 |
| MgO | 0-2 |
| CaO | 0-3 |
| SrO | 0-3 |
| BaO | 0-3 |
| ZnO | 0-3 |
| MgO + CaO + SrO + BaO + ZnO | 0-10 |
| $ZrO_2$ | 0-3 |
| $CeO_2$ | 0-1 |
| $WO_3$ | 0-1 |
| Refining agent | 0-2 |

The following table comprises Example 6 of the second group:

| | |
|---|---|
| $SiO_2$ | 65-82 |
| $B_2O_3$ | 5-13 |
| $Al_2O_3$ | 2-8 |
| $ZrO_2$ | 0-2 |
| $Li_2O + Na_2O + K_2O$ | 3-10 |
| MgO + CaO + SrO + BaO + ZnO | 0-7 |
| Refining agent | 0-2 |

The glass in accordance with the invention is preferably also free of coloring and/or optically active, as well a laser-active, components.

In particular, the glass in accordance with the invention is preferably also free of components that are sensitive to oxidation, such as, for example, $Ag_2O$ or $Bi_2O_3$, and/or free of toxic components or components hazardous to health, such as, for example, the oxides of Tl, Te, Be, and As. In any case, the glass is preferably free of arsenic.

In accordance with an embodiment of the present invention, the glass is also preferably free of other components not mentioned in the claims; that is, in accordance with such an additional embodiment, the glass essentially comprises the mentioned components.

The expression "essentially comprises" means in this case that other components are present at most as impurities, but are not added intentionally to the glass composition as individual components.

The glass in accordance with the invention can contain conventional refining agents in small amounts. Preferably, the sum of the added refining agents is at most 2.0 wt %, more preferably at most 1.0 wt %. As refining agent, the glass in accordance with the invention can contain at least one of the following components (in wt %, additively to the remaining glass composition):

|  |  |  |
|---|---|---|
| $Sb_2O_3$ | 0-1 | And/or |
| $As_2O_3$ | 0-1 | And/or |
| SnO | 0-1 | And/or |
| $SO_4^{2-}$ | 0-1 | And/or |
| $Cl^-$ | 0-1 | And/or |
| $F^-$ | 0-1 |  |

Fluorine and fluorine-containing compounds also tend to vaporize during the melting and fusing operation and during the sintering process and, as a result, make more difficult a precise adjustment of the glass composition or, after sintering, the glass matrix. The glass in accordance with the invention is therefore preferably also free of fluorine.

The glasses described in the examples were produced using different process parameters, which are associated with the physical properties of the glasses.

Production Example 2

The raw materials for the oxides are weighed, one or more refining agents, such as, for example, $Sb_2O_3$, are added, and subsequently well mixed. The glass quantity is fused at approximately 1320° C. in a discontinuous melting assembly and afterwards refined (1370° C.) and homogenized. At a pouring temperature of about 1320° C., the glass can be poured and processed to the desired dimensions as, for example ribbons. In large-volume, continuous assemblies, the temperatures can be lowered, according to experience, by at least approximately 100 K.

Ribbons are obtained by pouring the glass over two rollers. They can be better ground to powder, a precursor for sintering, than shards.

TABLE 4

Melt example for 100 kg of calculated glass
(in accordance with Example 8)

| Oxide | wt % | Raw material | Weighed quantity (g) |
|---|---|---|---|
| $SiO_2$ | 42.85 | $SiO_2$ | 42913.69 |
| $B_2O_3$ | 14.9 | $B_2O_3$ | 15128.18 |
| $Al_2O_3$ | 4.15 | AlO(OH) | 5348.39 |
| $Li_2O$ | 6.27 | $LiNO_3$ | 15598.33 |
| $Na_2O$ | 2.7 | $Na_2CO_3$ | 4613.41 |
| ZnO | 3.4 | ZnO | 3400.29 |
| SrO | 0.72 | $Sr(NO_3)_2$ | 1484.69 |
| BaO | 24.5 | $BaCO_3$ | 31779.59 |
| $TiO_2$ | 0.2 | $TiO_2$ | 201.51 |
| $Sb_2O_3$ | 0.30 | $Sb_2O_3$ | 301.14 |
| Sum | 100.20 |  | 120769.21 |

The properties of the glass thus obtained are presented in the following Table 5 as Example 8.

TABLE 5

| Oxide | Ex. 7 | Ex. 8 | Ex. 9 | Ex. 10 | Ex. 11 | Ex. 12 |
|---|---|---|---|---|---|---|
| $SiO_2$ |  | 42.9 | 61.4 | 49.5 | 68.2 | 80.6 |
| $B_2O_3$ |  | 14.9 | 8.2 | 14.2 | 19 | 12.7 |
| $P_2O_5$ | 49.8 |  |  |  |  |  |
| $Al_2O_3$ | 1.9 | 4.2 | 16.0 | 11.4 | 2.7 | 2.4 |

TABLE 5-continued

| Oxide | Ex. 7 | Ex. 8 | Ex. 9 | Ex. 10 | Ex. 11 | Ex. 12 |
|---|---|---|---|---|---|---|
| $Li_2O$ |  | 6.3 |  |  | 0.7 |  |
| $Na_2O$ | 9.8 | 2.7 |  |  | 0.7 | 3.5 |
| $K_2O$ |  |  |  |  | 7.9 | 0.6 |
| ZnO | 27.2 | 3.4 |  |  | 0.6 |  |
| MgO |  |  | 2.8 |  |  |  |
| CaO | 2.0 |  | 7.9 |  |  |  |
| SrO |  | 0.7 |  |  |  |  |
| BaO | 7.3 | 24.5 | 3.5 | 24.1 |  |  |
| $TiO_2$ |  | 0.2 |  |  |  |  |
| $La_2O_3$ | 2.0 |  |  |  |  |  |
| $n_d$ | 1.573 | 1.587 | 1.523 |  | 1.49 | 1.47 |
| $a_{(20.300° C.)}$ [$10^{-6}$/K] |  | 8.9 | 3.75 | 4.5 | 5.0 | 3.3 |
| Tg [° C.] | 373 | 493 | 709 | 711 | 488 | 525 |
| T (h = $10^{7.6}$ dPas) [° C.] |  | 593 | 883 | 942 | 715 | 820 |
| T (h = $10^4$ dPas) [° C.] | 551 | 751 | 1273 | 1263 | 1060 | 1260 |

Further exemplary embodiments of the production of the conversion material.

The examples described below in regard to the glasses of the second group are subject to essentially the same method of production in each case (see for this the glasses of the first group). For further or lacking details, reference is made to the preceding description.

Powders of the starting glasses, ground to a grain size having the distribution of $d10\geq=0.7$ μm, $d50\geq=3$ μm, and $d90\leq=150$ μm, are weighed with a luminophore—for example, Ce:YAG having a grain size with a mean diameter d50 between 1 μm and 50 μm, especially preferably between 1 μm and 20 μm, most preferably between 1 μm and 15 μm, based on weight percent—and blended in a mixing assembly—for example, a Turbula tumbling mixer (model T2C/ Willi A. Bachofen company/Basel) or Speedmix (model DAC 150 FVZ/Hauschildt Engineering)—for 1 to 120 min, preferably 1 to 5 min (Speedmix) or 15 to 120 min (Turbula), most preferably 1 to 3 min (Speedmix) or 60 to 120 min (Turbula).

The powder mixture or else the pure glass powder is subsequently taken in portions in such a way that a powder body having a diameter of approximately 12 mm/8 mm/<5 mm and a height of approximately 3 mm/2/1 can be prepared.

The bulk is deposited on a thermally stable substrate in, for example, a tube- or ring-shaped element that delimits the bulk and is compacted manually and/or fed uniaxially and/or cold-isostatically to a pressing process, which can be optimally designed by addition of convention processing auxiliaries. This takes place in such a manner that, subsequently, the outer delimitation can be removed.

Afterwards, the annealing of the samples takes place at temperature and time regimens (heating rates and dwell times) that are appropriate for the matrix glasses in terms of their softening temperature. Depending on the slope of the viscosity curve of the glass and without general restriction, the target temperatures T of the annealing lie in the range between the EW, the softening temperature, and Va, the processing temperature, of the matrix glass usually in a regimen of EW+150 K.

The heating takes place such that it is possible to assume an equilibrated temperature level in the oven and for the bulk or, as the case may be, several bulks.

In particular, the time regimen to be chosen in this case depends typically on the type, size, and design (also the control) of the annealing assembly. In the present oven (Nabertherm model N70/H; Naber C16 control and Eurotherm model 2604), heating rates of from 1 K/min to 30 K/min, preferably 1 K/min to 20 K/min, most preferably 1 K/min to 10 K/min, to the target temperature and dwell times before cooling with oven characteristic curve of 0 to 60 min, preferably 0 to 30, most preferably 10 to 30 min, have proven useful.

After the annealing or annealings, the composite bodies thus created, comprising glass matrix and at least one luminophore, are post-processed, with grinding and/or polishing agents of grain size <400 μm (two-sided) as well as, depending on the case, for example, diamond polishing agents of grain size up to <1 μm (single sided) being used, so that, as a result, surfaces that are raw on both sides or on one side or are polished are present.

The measurement of the optical data for reflection and transmission takes place in a conventional spectrometer, with sample in front or at the input (transmission) or in back or behind at the output (reflection) of an integration sphere, in the wavelength region from 250 to 2500 nm, at least, however, in the region from 300 to 800 nm, in order to determine the aforementioned values.

12 mm (for a rectangular sample 2). The thickness of the sample lies at about 1 mm (±0.05 mm). A spectrometer 4 with a photodetector for detecting the light registered by the integration sphere 3 is arranged in the beam direction directly behind the integration sphere 3.

During the measurement of $T_{half}$, the sample 2 is positioned at a distance of less than or equal to about 3 mm from the integration sphere 3 in order to register both the directly transmitted portion of the light and the portions scattered in the sample 2 emitted from the parallel light source 1.

By contrast, during the measurement of $T_{forward}$, the sample 2 is positioned at a distance from the integration sphere 3. The distance is about 43 cm. As a result, essentially only the directly transmitted portion or the portion transmitted in the forward direction is registered.

This kind of measurement makes possible a classification of the undoped samples 2 investigated here and/or, as the case may be, the doped samples 2 in regard to their transmission and/or scattering behavior. The classification of the samples 2 or the characterization of the samples 2 can be expressed by the quotient $T_{half}:T_{forward}$.

TABLE 6

| | Example | | | | | | | |
|---|---|---|---|---|---|---|---|---|
| | I | J | K | L | M | N | O | P |
| Glass type/Fraction wt % | Ex. 7 100 | Ex. 8 98 | Ex. 9 95 | Ex. 10 85 | Ex. 11 95 | Ex. 11 90 | Ex. 12 100 | Ex. 12 90 |
| Luminophore 1/Fraction wt % | 0 | 2 | 5 | 15 | 5 | 10 | 10 | 10 |
| Luminophore 2/Fraction wt % | 0 | 0 | 0 | 0 | 0 | 0 | 0 | 0 |
| Temperature/° C. | 700 | 700 | 700 | 700 | 650 | 650 | 743 | 770 |
| Ramp/K/min | 1 | 1 | 1 | 1 | 15 | 15 | 1 | 1 |
| Dwell tme/min | 0 | 0 | 10 | 5 | 45 | 60 | 0 | 5 |
| Thickness undoped/mm | 1.5 | 1.5 | 1.5 | 1.5 | 0.8 | 0.9 | 1.5 | 1.5 |
| Reflection + Transmission undoped/%; for Vis (380-780 nm) incl. PL 404 . . . 460 nm | 72 + 9 = 81 | 78 + 11 = 89 | 81 + 9 = 90 | 83 + 11 = 94 | 63 + 24 = 87 | 63 + 24 = 87 | 87 + 9 = 96 | 87 + 9 = 96 |
| Intrinsic color undoped | None | None | None | None | None | None | None | None |
| Thickness doped/mm | nn | nn | Nn | Nn | Nn | 0.3 | Nn | 0.3 |
| Reflection doped At PL 460 nm | | | | | | 24 | | 16 |
| Reflection + Transmission doped/%; Thickness/mm for Vis (380-780 nm) excluding PL | | | | | | 58 + 23 = 81 | | 78 + 14 = 92 |

The present invention will be explained below on the basis of FIGS. 1 to 5.

First of all, FIG. 1 illustrates the measurement of the parameter $T_{half}$ (top) and $T_{forward}$ (bottom) on a sample 2 of a matrix glass, which has been ground to a powder and sintered, by means of an integration sphere 3.

The integration sphere 3 has a diameter of 60 mm and a sphere aperture with a diameter of about 12 to 15 mm. A rectangular diaphragm (cross section: 6×12 mm²) is positioned before the sphere 3 as an additional component. A light source 1, which emits essentially only parallel light in relation to the beam axis as measuring beam, is positioned at a spacing of approximately 50 cm from the integration sphere 3. The measuring beam has a cross section of 4×10 mm². A sample 2 to be investigated is arranged at various distances between the integration sphere 3 and the light source 1. The sample 2 has an outer diameter greater than about 12 mm or greater than about 12 mm times greater than For an ideally optically transparent, non-scattering sample 2, such that the light beams would run exclusively in the beam direction, a value of 1 or nearly 1 would be obtained for the ratio $T_{half}:T_{forward}$. By contrast, a sample with a high scattering behavior would lead to very large values of $T_{half}:T_{forward}$.

During the measurement of the transmission, the sample 2 is thus positioned before and, in particular, at the input of the integration sphere 3. In contrast to this, during the measurement of reflection, the sample 2 is positioned behind and, in particular, at the output of the integration sphere 3. The detector of the spectrometer 4 is located at any point on the circumference of the integration sphere 3.

Figure 2:
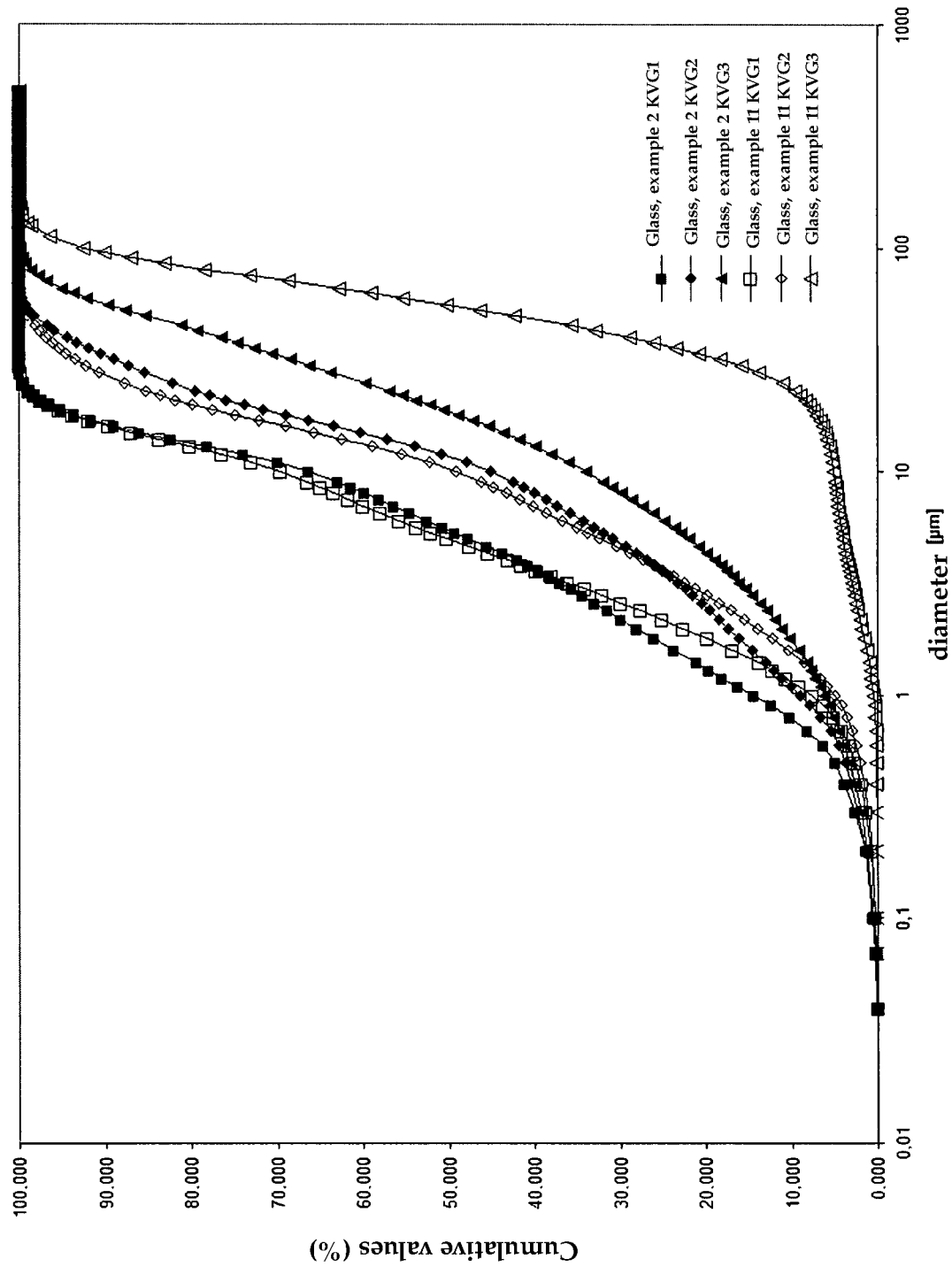
FIG. 2 illustrates cumulative values of grain size distribution as a function of diameter of the grains.
Figure 3:
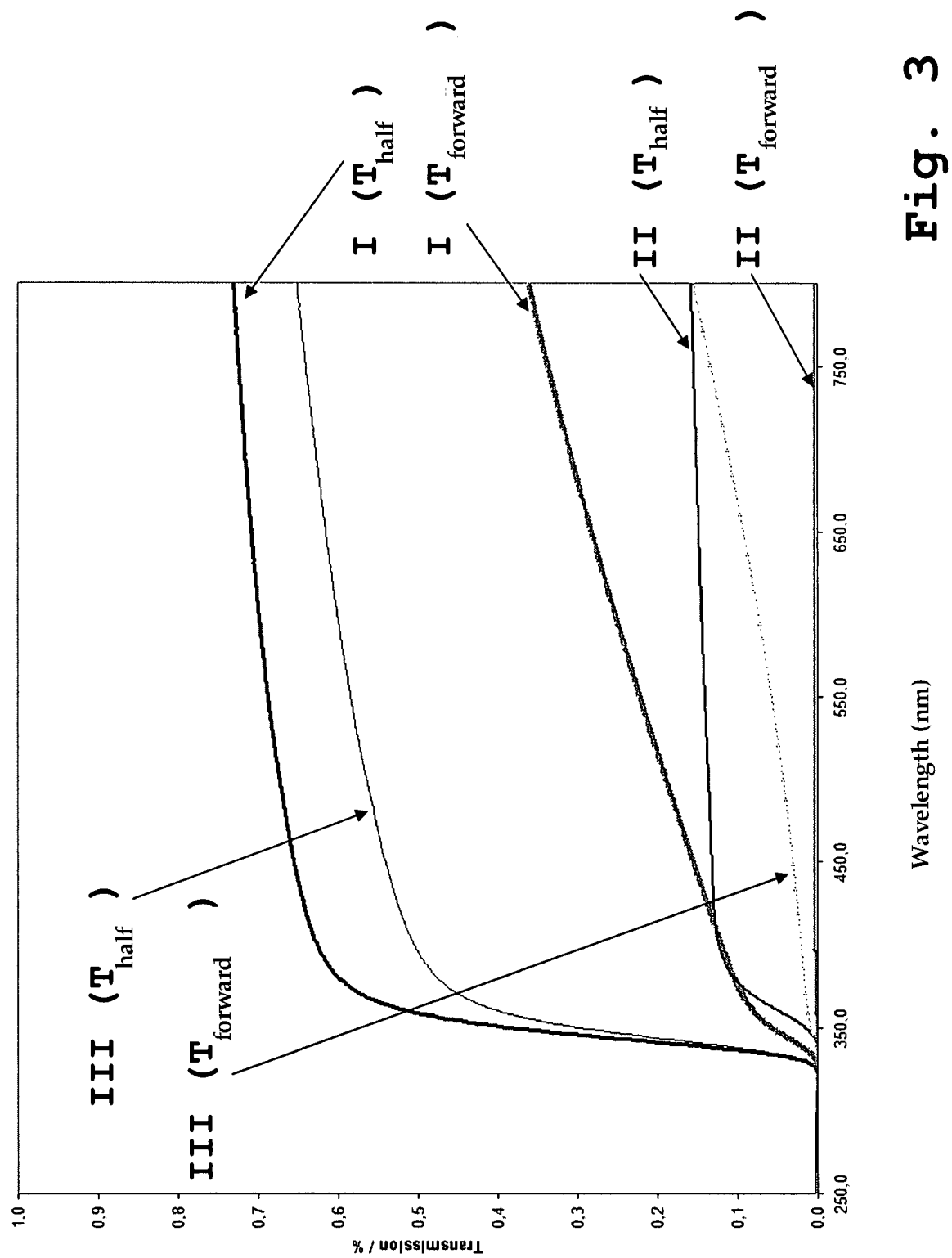
FIG. 3 shows transmission $T_{half}$ and $T_{forward}$ as a function of the light wavelength.
Figure 4:
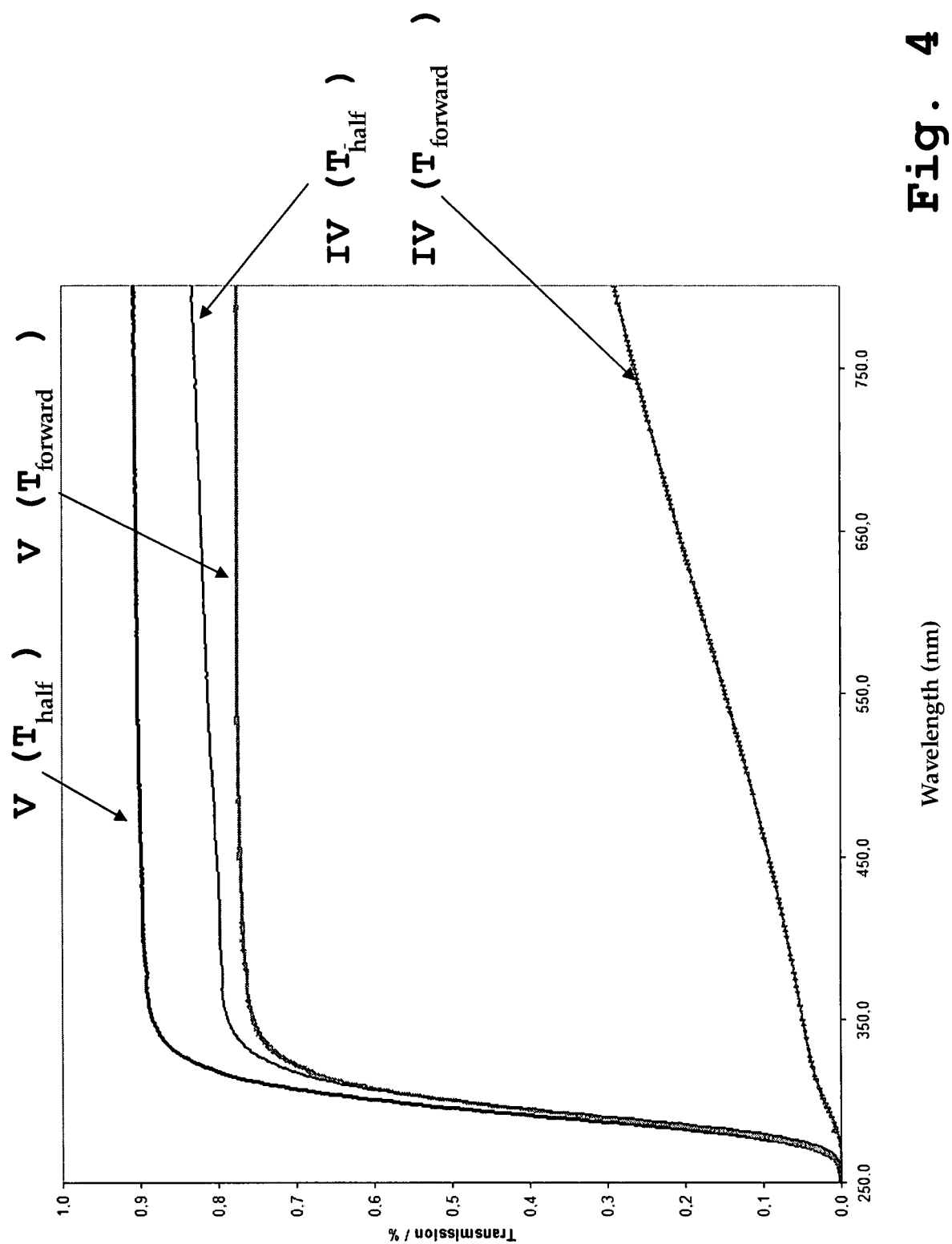
FIG. 4 shows the transmission $T_{half}$ and $T_{forward}$ as a function of the light wavelength.
Figure 5:
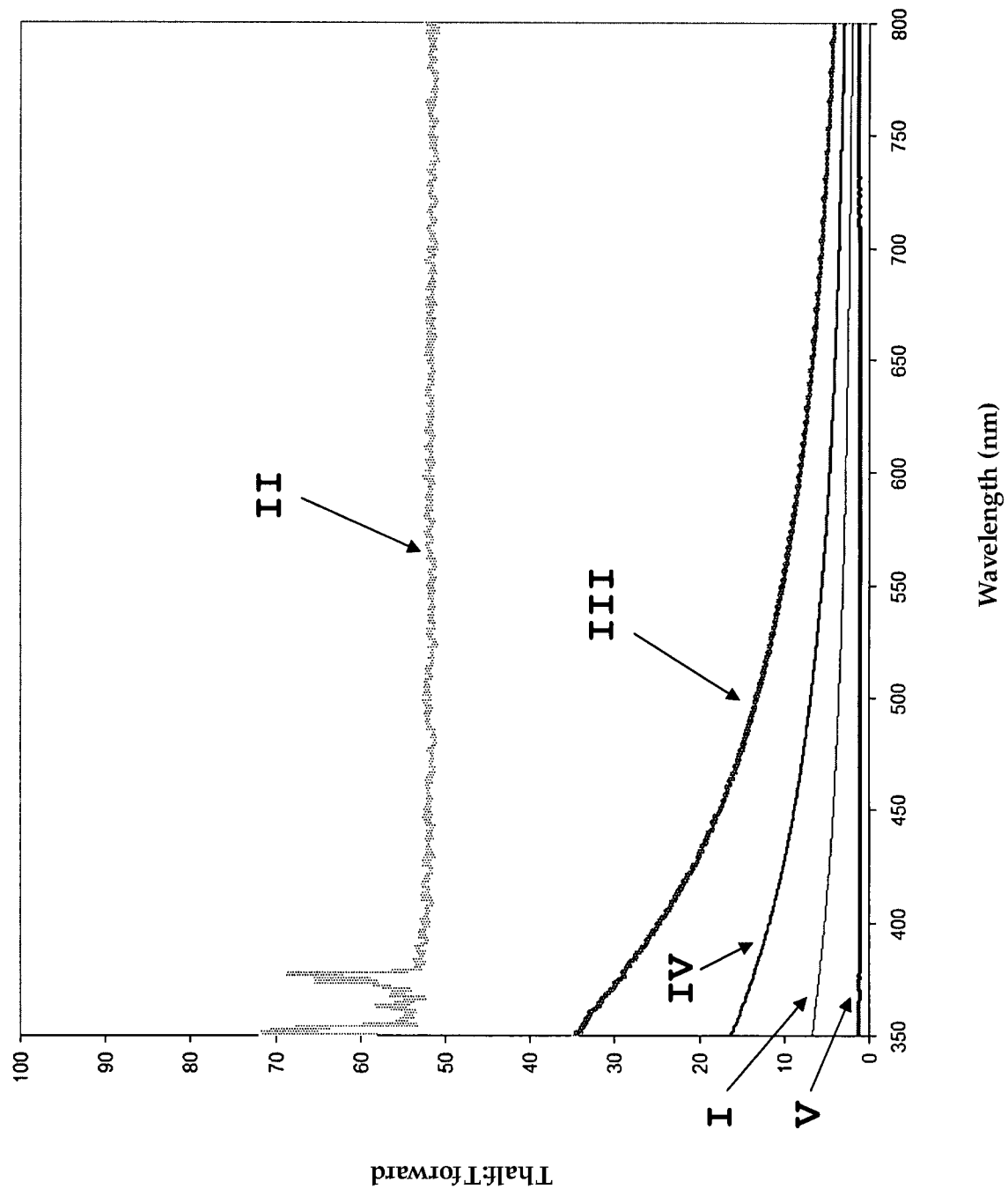
FIG. 5 illustrates the ratio of $T_{half}$ over $T_{forward}$.

Illustrated in FIGS. 2 to 5 are several results, which were determined for the aforementioned Glass Example 2) see Tables 2 and 3) and the aforementioned Glass Example 11 (see Tables 2 and 3). Shown in FIG. 2 are the grain size distributions in accordance with the invention, while FIGS. 3 to 5 show the associated results for $T_{half}$:$T_{forward}$.

These optical characteristic sizes can be measured, for example, by means of a commercially available spectrometer (for example, Perkin Elmer Lambda 9 or 900).

Illustrated to this end in FIG. 2 are the cumulative values of the grain size distribution as a function of the diameter of the grains (measurement, for example, with a Cilas Model 1064 grain size measuring instrument). Specifically illustrated are three different grain size distributions (KGV1, KGV2, and KGV3) [KGV=grain size distribution] for the two aforementioned Glass Examples 2 and 11. The "numerical" results, belonging to FIG. 2, for the grain sizes at d10, d50, and d90 are summarized in Table 7. Shown in the first column are the designations used in Table 8.

TABLE 7

|  |  | Diameter d10 (10.00%) | Diameter D50 (50.00%) | Diameter d90 (90.00%) |
|---|---|---|---|---|
| II | Glass Ex. 2 KGV 1 | 0.8 | 5.4 | 16.4 |
| I | Glass Ex. 2 KGV 2 | 1.1 | 11.7 | 33.3 |
| — | Glass Ex. 2 KGV 3 | 1.8 | 18.7 | 56.5 |
| V | Glass Ex. 11 KGV 3 | 23.6 | 55.8 | 94.9 |
| — | Glass Ex. 11 KGV 2 | 1.5 | 10.3 | 27.2 |
| IV | Glass Ex. 11 KGV 1 | 1.2 | 5.0 | 16.1 |

The illustration is explained on the basis of Example 11 KGV3 (line V): 10% of the grains or particles have a diameter of less than about 23.6 μm, 50% of the particles have a diameter of less than about 55.8 μm, and 90% of the particles have a diameter of less than 94.9 μm. It can be seen that the particles for 11 KGV3 have the largest diameters.

The process parameters used for the Glass Examples 2 KGV1 (II), 2 KGV2 (I), 11 KGV1 (IV), 11 KGV3 (V) are summarized in Table 8. In this case, two different methods are given for the Glass Example 2 KGV1: (II) with double annealing, that is, sintering and subsequent thermal treatment, as well as, for example, a second sintering, and (III) with single annealing or sintering. The parameter (t@T/') describes the dwell time at T in minutes.

TABLE 8

|  | Glass 2 KGV 2 | Glass 2 KGV 1 | Glass 2 KGV 1 | Glass 11 KGV 1 | Glass 11 KGV 3 |
|---|---|---|---|---|---|
| Example | I | II | III | IV | V |
| Thickness/mm | 1.00 | 0.99 | 1.00 | 1.02 | 1.01 |
| $T_{half}$:$T_{forward}$ (400 nm; 750 nm) | 5.2; 2.2 | 52; 52 | 24.2; 4.8 | 11.6; 3.2 | 1.17; 1.17 |
| Annealing 1 T/° C., t@T/' | 700, 0 | 700, 0 | 700, 0 | 760, 60 | 760, 60 |
| Annealing 2 T/° C., P/bar, t@T/' | 650, 500, 30 | 650, 500, 30 | 0, 0, 0 | 650, 0 | 650, 500, 3 500, 30 |

FIG. 3 shows the transmission $T_{half}$ and $T_{forward}$ as a function of the light wavelength for the aforementioned Examples I to III. FIG. 4 shows the transmission $T_{half}$ and $T_{forward}$ as a function of the light wavelength for the Examples IV and V. If the separation of the curves $T_{half}$ and $T_{forward}$, that is, the difference of the ordinate values, is relatively small, so that Sample 2 has a small scatter. If, by contrast, the curves have a relatively large separation from each other, Sample 2 has a large scatter. The characterization of Samples 2 takes place by way of the quotient $T_{half}$:$T_{forward}$.

Illustrated to this end, finally, in FIG. 5 is the ratio of $T_{half}$ over $T_{forward}$. For all shown Examples I to V, the ratios achieved lie in the range that is advantageous in accordance with the invention. For Example V, for which the particles have the largest diameter, a $T_{half}$:$T_{forward}$ value of even nearly 1 is obtained. The sintered glass body has a small scatter. Whether the scatter within the sample is undesired or even desired is decided on the basis of the converter system, that is, containing embedded luminophore, or on the basis of the overall conversion-LED system on the basis of the requirements placed on the system. For example, in a system in which the refractive indices lie close to one another, a larger scatter may be required. In particular, it is also crucial that the criterion for the sum of transmission and reflection is fulfilled.

The matrix glass described above can be used for creating a light source, in particular a white or colored light source, with the matrix glass containing the luminophore or luminophores corresponding to a conversion material that preferably comprises the features of the conversion material defined in one of claims 1 to 21 and preferably is produced by means of a method having the features of one of claims 22 to 28.

In a preferred embodiment, the light source comprises a primary light source, in particular a semiconductor light source, which emits light with wavelengths in the region from 225 nm to 520 nm, preferably from 350 nm to 480 nm, most preferably with wavelengths in the region from 400 nm to 480 nm.

In an alternative embodiment, the primary light source comprises an LED, which emits light with a wavelength in the region from 400 nm to 480 nm, preferably 420 nm to 480 nm.

In another preferred embodiment, the primary light source comprises a UV LED, which emits light with a wavelength in the region 235 nm to 400 nm, preferably 350 nm to 400 nm.

In yet another embodiment, the primary light source comprises the primary light source of a semiconductor laser diode, which emits light with a wavelength in the region from 400 nm to 480 nm.

The light source can have one or more, in particular also several different, primary light sources.

Further descriptions of these light sources as well as their spatial arrangement and properties may be found in the application titled "Optik-Konverter-System für (W)LEDs" [Optical Converter System for (W)LEDs] with the internal file reference 08SGL0020DEP or P 3156 and in the application titled "Gehäuse fur LEDs mit hoher Leistung" [Housing for LEDs with High Power"] with the internal file reference 08SGL0060DEP or P 3063 of the same applicant, which were filed on the same day as this application and which are also in full scope a part of the content of this application by way of reference.

With several primary light sources and several luminophores, it is possible to create a light source with which it is possible to emit light at the following color coordinates in (X, Y) color space, in particular by selecting the luminophore or luminophores as well as by adjusting the concentration of the luminophores and/or the thickness of the converter material:

A=(0.16,0.02)
B=(0.05,0.30)
C=(0.02,0.76)
D=(0.21,0.76)
E=(0.72,0.28).

In this way, a color space within the traverse ABCDE is defined or enclosed, within which light of all color coordinates can essentially be emitted from the light source.

The adjustment of the color coordinates within the aforementioned traverse as well as the traverse discussed below can be undertaken at one time and in a definitively defined manner by establishing the ratio and concentration of the respective luminophores as well as, in the case of several light sources, the intensity of emission of the respective light sources.

Furthermore, in the case of several primary light sources, it is additionally possible, within a certain scope, to change the color coordinate by changing the intensity of the emission of one or more primary light sources.

In another embodiment of the light source, it is possible to emit light at the following color coordinates in (X, Y) color space, in particular by selecting the primary light source, by selecting the luminophore or luminophores as well as by adjusting the concentration of the luminophores and/or the thickness of the converter material:

F=(0.28,0.24)
G=(0.37,0.35)
H=(0.37,0.40)
I=(0.24,0.28).

In yet another embodiment of the light source, it is possible to emit light at the following color coordinates in (X, Y) color space, in particular by selecting the primary light source, by selecting the luminophore or luminophores as well as by adjusting the concentration of the luminophores and/or the thickness of the converter material:

J=(0.37,0.35)
K=(0.37,0.42)
L=(0.50,0.45)
M=(0.50,0.38).

In yet another embodiment of the light source, it is possible to emit light at the following color coordinates in (X, Y) color space, in particular by selecting the primary light source, by selecting the luminophore or luminophores as well as by adjusting the concentration of the luminophores and/or the thickness of the converter material:

N=(0.21,0.76)
O=(0.66,0.34)
P=(0.60,0.34)
Q=(0.15,0.76).

In this way, it is possible to create, in particular, saturated colors green-yellow-orange (amber) NOPQ and, moreover, it is possible, to create all saturated colors in the spectral region from 535 nm to 610 nm by selection of the primary light source or light sources, which, otherwise, would have only low efficiencies with pure LEDs.

For understanding the following patent claims, it is noted that, for a first embodiment of the invention, the term "in the spectral region in which the primary light source emits light" allows comprises only the spectral region of a single primary light source. This single primary light source is, in this case, one of the primary light sources mentioned in the preceding description or in the following claims.

In further embodiments in accordance with the invention, the term "in the spectral region in which the primary light source emits light" comprises the spectral region of more than only a single primary light source. In this case, two or more than two primary light sources with various emission spectra may be used, in particular in order to span a larger color spaces as well. However, these two or more primary light sources also each comprise only the primary light sources mentioned only in the preceding description or in the following claims.

It is obvious to the skilled practitioner that the described embodiments are to be understood as examples. The invention is not limited to these, but rather can be varied in diverse ways without departing from the spirit of the invention. The features of the individual embodiments and the features mentioned in the general part of the description can each be combined both among each other and with each other.

What is claimed is:

1. A conversion material for a white or colored light source, comprising:
   a matrix glass comprising a lanthanum borosilicate glass with a zinc fraction; and
   at least one luminophore,
   wherein the matrix glass and the at least one luminophore are formed as a sintered compact from a powder of the matrix glass, the powder having a grain size distribution $d10 \geq 0.7$ μm, $d50 \geq 3$ μm and $d90 \leq 150$ μm.

2. The conversion material according to claim 1, wherein the grain size is sufficient such that the matrix glass has a sum of transmission and reflection in the spectral region from 350 nm to 800 nm and in a spectral region in which the light source emits light is at least greater than 80%.

3. The conversion material according to claim 1, wherein the sintered compact has a reflection in a spectral region in which the light source emits light of less than 30% and has a sum of transmission and reflection in a spectral region from 350 nm to 800 nm, except for the spectral region in which the light source emits the light, that is at least greater than 80%.

4. The conversion material according to claim 1, wherein the at least one luminophore has a grain size distribution having a mean diameter d50 between 1 μm and 50 μm.

5. The conversion material according to claim 1, wherein the at least one luminophore has a grain size distribution having a mean diameter d50 between 1 μm and 20 μm.

6. The conversion material according to claim 1, wherein the at least one luminophore has a grain size distribution having a mean diameter d50 between 1 μm and 15 μm.

7. The conversion material according to claim 1, wherein the sintered compact has, in a spectral region from 350 to 800 nm, but without a region in which the light source emits light, maximum and minimum contributions to the difference of reflection and transmission established over this spectral region differ by no more than 40%, and has an internal conversion quantum yield of the at least one luminophore is reduced in relation to the internal conversion yield of non- embedded luminophores by no more than 20%.

8. The conversion material according to claim 1, wherein the matrix glass comprises in weight percent:

| | |
|---|---|
| $SiO_2$ | 3-7; |
| $B_2O_3$ | 16-22; |
| $Al_2O_3$ | 0-1; |
| ZnO | 3-26; |
| $TiO_2$ | 1-11; |
| $ZrO_2$ | 1-8; |
| $La_2O_3$ | 32-45; |
| $Nb_2O_5$ | 5-16; |
| $WO_3$ | 0-7; |
| $Y_2O_3$ | 0-5; |
| BaO | 0-6; |
| MgO | 0-6; |
| CaO | 0-6; |
| SrO | 0-6; |
| sum of alkaline-earth oxides | 0-10; and |
| refining agent | 0-2. |

9. The conversion material according to claim 1, wherein the matrix glass, as a bulk material, has a refractive index of 1.43 to 1.6.

10. The conversion material according to claim 1, wherein the matrix glass, as a bulk material, has a refractive index of 1.45 to 1.59.

11. The conversion material according to claim 1, wherein the zinc fraction comprises zinc phosphates.

12. The conversion material according to claim 1, wherein the matrix glass is free of $Tl_2O$, $TeO_2$, and $As_2O_3$.

13. The conversion material according to claim 1, wherein the at least one luminophore comprises a host material that is at least one substance selected from the group consisting of oxides, nitrides, oxynitrides, sulfides, oxysulfides, halides, halooxides, halosulfides, tellurides, and selenides, and wherein the host material is doped with at least one substance selected from the group consisting of rare earths, transition metals, and heavy metals.

14. A conversion material for a white or colored light source, comprising:
   a matrix glass comprising an aluminum borosilicate glass with an yttrium fraction; and
   at least one luminophore,
   wherein the matrix glass and the at least one luminophore are formed as a sintered compact from a powder of the matrix glass, the powder having a grain size distribution $d10 \geq 0.7$ μm, $d50 \geq 3$ μm and $d90 \geq 150$ μm.

15. The conversion material according to claim 14, wherein the matrix glass comprises alkaline-earth silicates.

16. A method of producing a conversion material, comprising the steps of:
   providing a matrix glass comprising a lanthanum borosilicate glass with a zinc fraction or an aluminum borosilicate glass with an yttrium fraction;
   grinding the matrix glass to a powder with a grain size distribution of grain sizes $d10 \geq 0.7$ μm, $d50 \geq 3$ μm, and $d90 \leq 150$ μm;
   mixing the powder with a powdered luminophore to form a mixture;
   pressing the mixture to form a pressed mixture; and
   sintering the pressed mixture to form a sintered compact.

17. A light source, comprising:
   a matrix glass comprising a lanthanum borosilicate glass with a zinc fraction or an aluminum borosilicate glass with an yttrium fraction;
   at least one luminophore, wherein the matrix glass and the at least one luminophore are formed as a sintered compact from a pressed mixture of a powder of the matrix glass and a powder of the at least one luminophore, the powder of the matrix glass having a grain size distribution $d10 \geq 0.7$ μm, $d50 \geq 3$ μm and $d90 \leq 150$ μm; and
   a primary light source that emits light with wavelengths in a region from 225 nm to 520 nm.

18. The light source according to claim 17, wherein the primary light source comprises an LED that emits the light with a wavelength in a region from 400 nm to 480 nm.

19. The light source according to claim 18, wherein the light is emitted at color coordinates in (X, Y) color space comprising:
   A=(0.16,0.02)
   B=(0.05,0.30)
   C=(0.02,0.76)
   D=(0.21,0.76)
   E=(0.72,0.28).

20. The light source according to claim 19, wherein the light has a color space defined within a polygon traverse ABCDE within which essentially light of all color coordinates.

* * * * *